US011955733B2

(12) United States Patent
Luk et al.

(10) Patent No.: US 11,955,733 B2
(45) Date of Patent: Apr. 9, 2024

(54) MILLIMETER-WAVE END-FIRE MAGNETO-ELECTRIC DIPOLE ANTENNA

(71) Applicant: City University of Hong Kong, Hong Kong (HK)

(72) Inventors: Kwai Man Luk, Hong Kong (HK); Ao Li, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 440 days.

(21) Appl. No.: 17/464,721

(22) Filed: Sep. 2, 2021

(65) Prior Publication Data

US 2023/0076567 A1 Mar. 9, 2023

(51) Int. Cl.

*H01Q 19/10* (2006.01)
*H01Q 3/40* (2006.01)
*H01Q 9/04* (2006.01)
*H01P 3/12* (2006.01)

(52) U.S. Cl.

CPC ............. *H01Q 9/0421* (2013.01); *H01Q 3/40* (2013.01); *H01Q 19/10* (2013.01); *H01P 3/12* (2013.01)

(58) Field of Classification Search

CPC ........ H01Q 9/0421; H01Q 3/40; H01Q 19/10; H01Q 7/00; H01Q 9/04; H01Q 25/00; H01Q 1/38; H01P 3/12

See application file for complete search history.

(56) References Cited

U.S. PATENT DOCUMENTS 7,843,389 B2 11/2010 Luk et al.
9,653,810 B2 5/2017 Luk et al.
10,658,755 B2 * 5/2020 Hashimoto .......... H01Q 9/0457
10,854,994 B2 * 12/2020 Niroo Jazi ........... H01Q 1/2283

(Continued)

OTHER PUBLICATIONS

A. Li and K. Luk, "Single-layer wideband end-fire dual-polarized antenna array for device-to-device communication in 5G wireless systems," IEEE Trans. Veh. Technol., vol. 69, No. 5, pp. 5142-5150, May 2020.

(Continued)

*Primary Examiner* — Hai V Tran
*Assistant Examiner* — Michael M Bouizza
(74) *Attorney, Agent, or Firm* — Idea Intellectual Limited; Margaret A. Burke; Sam T. Yip

(57) ABSTRACT

The present invention provides a new wideband mm-wave end-fire magneto-electric dipole antenna with excellent beam-scanning radiation patterns and reasonably low side lobes and low cross polarizations. The antenna comprises: an asymmetrical substrate integrated coaxial line feed comprising: a first substrate having a first substrate thickness; a second substrate placed on the first substrate and having a second substrate thickness different from the first substrate thickness; a conductive signal line deposited on an upper surface of the first substrate; and two rows of waveguiding vias positioned along and at both sides of the signal line respectively; a Γ-shaped probe adopted to excite the antenna; a pair of shorted planar parallel plates serving as magnetic dipole and two pair of vertical conductive vias serving as electric dipole; and a folded vertical reflector consisting of conductive vias and strips is added to reduce the back radiation and to improve the gain of antenna.

16 Claims, 32 Drawing Sheets
(3 of 32 Drawing Sheet(s) Filed in Color)

(56) References Cited

U.S. PATENT DOCUMENTS

| | | | | |
|---|---|---|---|---|
| 11,018,434 | B2 * | 5/2021 | Tsutsumi | H01Q 13/10 |
| 11,056,794 | B2 * | 7/2021 | Hashimoto | H01Q 1/48 |
| 11,271,322 | B2 * | 3/2022 | Chan | H01Q 5/392 |
| 11,575,206 | B2 * | 2/2023 | Hu | H01Q 21/065 |

OTHER PUBLICATIONS

R. Reese, M. Jost, M. Nickel, E. Polat, R. Jakoby and H. Maune, "A fully dielectric lightweight antenna array using a multimode interference power divider at W-band," IEEE Antennas Wireless Propag. Lett., vol. 16, pp. 3236-3239, 2017.

P. Liu, X. Zhu, Z. H. Jiang, Y. Zhang, H. Tang and W. Hong, "A compact single-layer Q-band tapered slot antenna array with phase-shifting inductive windows for endfire patterns," IEEE Trans. Antennas Propag., vol. 67, No. 1, pp. 169-178, Jan. 2019.

Y. Li and K. Luk, "A multibeam end-fire magnetoelectric dipole antenna array for millimeter-wave applications," in IEEE Transactions on Antennas and Propagation, vol. 64, No. 7, pp. 2894-2904, Jul. 2016.

J. Wang, Y. Li, L. Ge, J. Wang and K. Luk, "A 60 GHz horizontally polarized magnetoelectric dipole antenna array with 2-D multibeam endfire radiation," IEEE Trans. Antennas Propag., vol. 65, No. 11, pp. 5837-5845, Nov. 2017.

J. Zeng and K. Luk, "Wideband millimeter-wave end-fire magneto-electric dipole antenna with microstrip-line feed," IEEE Trans. Antennas Propag. To be published.

* cited by examiner

10

MILLIMETER-WAVE END-FIRE MAGNETO-ELECTRIC DIPOLE ANTENNA

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to wide-band antenna for millimeter-wave (mm-wave) applications. More specifically, the present invention relates to wide-band end-fire magneto-electric dipole antenna based on asymmetrical substrate integrated coaxial line (ASICL) feed.

BACKGROUND OF THE INVENTION

Mm-wave technology is one of the most important parts of the fifth generation (5G) wireless communications. Since the electromagnetic (EM) waves of mm-wave frequencies suffer from high propagation losses, high-gain antennas are usually required for mm-wave systems. Arraying is a typical and useful solution to enhance the antenna gain. In addition, to further improve the spatial coverage, beamforming or beam-scanning is another desirable property of antennas in mm-wave bands.

Many planner antenna arrays with broadside radiation have been reported for both high-gain and beam-scanning requirements. But on the other hand, antenna arrays with end-fire radiation are still not common enough in mm-wave bands. End-fire antennas (arrays) can save the space and provide some flexibility in practical scenarios, and are attractive for various terminal devices.

End-fire antenna arrays with a fixed beam were demonstrated, but these arrays were not suitable for beam-scanning applications. By adopting the concept of magneto-electric (ME) dipole antenna, end-fire SIW-fed antennas with vertical and horizontal polarizations respectively were reported. These two ME dipole antennas exhibited impedance bandwidths over 40%, but the multi-beam array designs were demonstrated with bandwidths narrowed to 20% due to employing the SIW feed networks. More recently, another end-fire ME dipole antenna was proposed and a 1×4 fixed-beam array was examined with an impedance bandwidth of 60.6%. However, this antenna was also fed by a microstrip line (MSL) and the radiation was horizontally polarized which is not suitable for interfacing with other planar circuits.

Thus, there is a need in the art for a different approach to antenna design in which the antenna provides wider bandwidth and smaller gain variation, and a simple interface with other planar circuits.

SUMMARY OF THE INVENTION

According to one aspect of the present invention, a new wideband end-fire ME dipole antenna with excellent beam-scanning radiation patterns and reasonably low side lobes and low cross polarizations is provided for mm-wave applications. The antenna comprises: an ASICL feed comprising: a first substrate having a first substrate thickness; a second substrate placed on the first substrate and having a second substrate thickness different from the first substrate thickness; a conductive signal line deposited on an upper surface of the first substrate; and two rows of waveguiding vias positioned along and at both sides of the signal line respectively; a Γ-shaped probe adopted to excite the antenna; a pair of shorted planar parallel plates serving as magnetic dipole and two pair of vertical conductive vias serving as electric dipole; and a folded vertical reflector consisting of conductive vias and strips is added to reduce the back radiation and to improve the gain of antenna.

Compared to using a conventional SICL, the ASICL configuration can achieve a better transition of energy between the ASICL feed and the Γ-shaped probe as the majority of energy is distributed between the signal line and the closer ground plane. As a result, the Γ-shaped probe can easily carry the EM waves and excite the antenna. Therefore, a much smaller gain variation (1.1 dB) can be achieved with a reasonably low level of cross polarization. Moreover, the asymmetric geometry allows the ASICL feed to have a relatively high characteristic impedance (CI) value without the need to have a very narrow conductive signal line width.

According to another aspect of the present invention, a fixed beam antenna array is constructed with a N number of the new millimeter-wave end-fire magneto-electric dipole antenna and an ASIC-based 1-to-N power divider configured to act as a feed network connecting an input port to the N number of the antenna elements. The ASIC-based 1-to-N power divider is formed by cascading a N−1 number of 1-to-2 power dividers, while $N=2^M$, where M is an integer.

Owning to the wideband element and ASICL-based feed network, the provided fixed beam antenna array exhibits a large impedance bandwidth (exceeding 60%) and a high radiation efficiency (79%).

According to further aspect of the present invention, a multi-beam antenna array is constructed with a N number of the new millimeter-wave end-fire magneto-electric dipole antenna; and an ASIC-based N-by-N Butler matrix configured to act as a feed network connecting a N number of input ports to the N number of the antenna elements. The ASIC-based N-by-N Butler matrix may consist of four 3-dB hybrid couplers, two crossovers, two −45° phase shifters, and two 0° phase shifters.

In addition to a smaller gain variation and a comparable scan range, the provided multi-beam antenna array exhibits an operating frequency at 24-32 GHz with a wider bandwidth (28.6%).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention are described in more detail hereinafter with reference to the drawings, in which.

DETAILED DESCRIPTION

In the following description, a millimeter-wave end-fire magneto-electric dipole antenna and a method for manufacturing the same are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
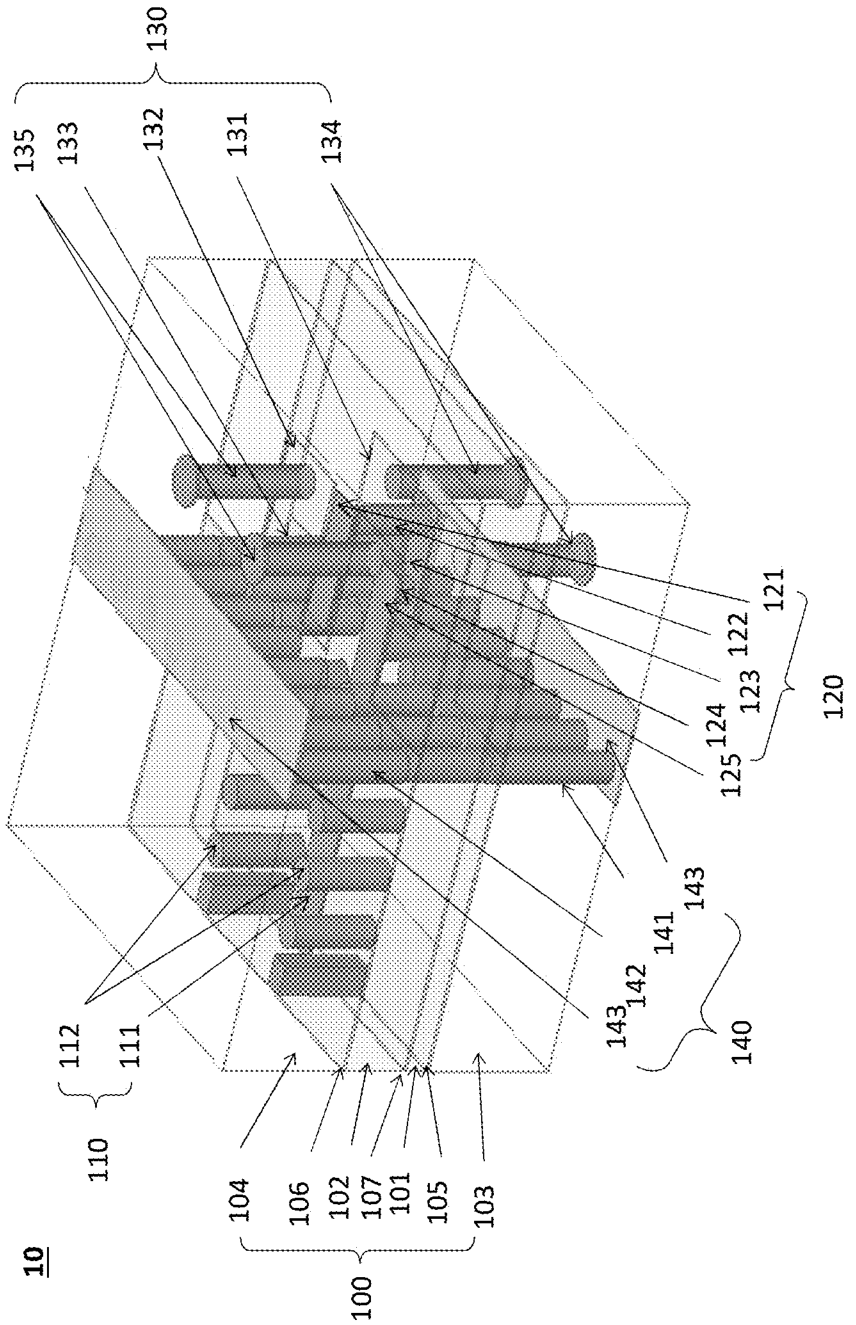
FIGS. 1A-1C depict an isometric view, side view and a top view of a millimeter-wave end-fire magneto-electric dipole antenna according to one embodiment of the present invention, respectively.
Figure 1B:
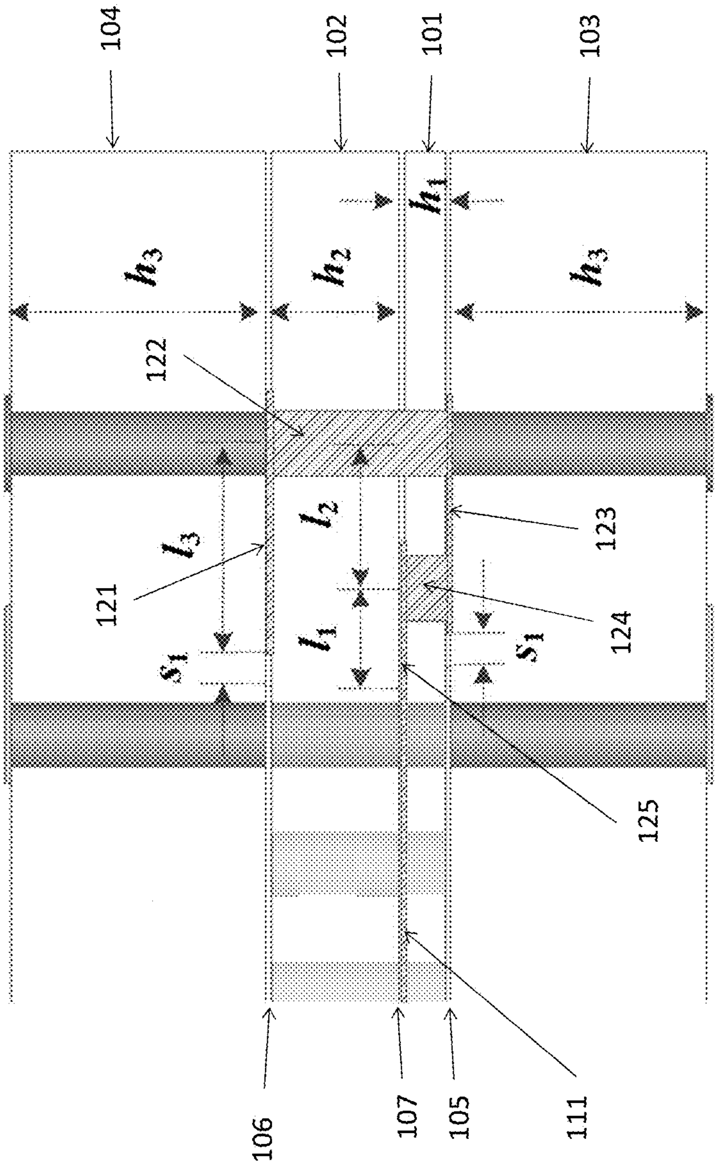
Figure 1C:
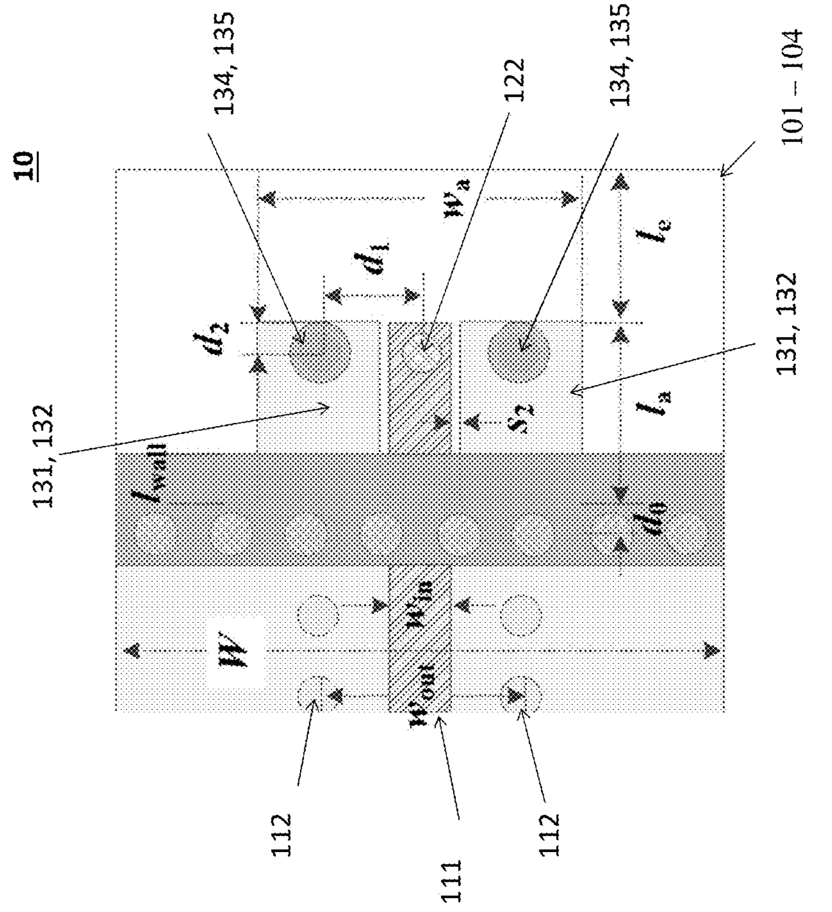

FIGS. 1A-1C depict an isometric view, side view and a top view of a millimeter-wave end-fire magneto-electric dipole antenna according to one embodiment of the present invention. Referring to FIGS. 1A-1C, the antenna may include a multiple-layered print circuit board (PCB) 100, an asymmetric substrate integrated coaxial line (ASICL) feed 110, a probe 120, a radiator 130 and a reflector 140.

The PCB 100 may comprise at least a substrate 101, a substrate 102 placed on the first substrate 101, a substrate 103 placed beneath the first substrate 101 and a substrate 104 placed on the substrate 102. The PCB 100 may further comprise a lower ground plane 105 formed on a bottom surface of the substrate 101 and an upper ground plane 106 formed on a top surface of a substrate 102.

The substrates 101, 102 may be made from dielectric substrates. Preferably, the dielectric substrates may have characteristics of $\varepsilon_r$=2.2 and tan δ=0.0009 (e.g. the Rogers 5880). The substrate 101 may have a substrate thickness, $h_1$, and the substrate 102 may have a substrate thickness, $h_2$, which is different from $h_1$. For example, the thickness $h_1$ may be substantially equal to 0.254 mm and the thickness $h_2$ may be substantially equal to 0.787 mm. Preferably, the substrates 103, 104 may have a same thickness $h_3$. The thickness $h_3$ may have a typical value substantially equal to 1.575 mm.

The PCB 100 may further comprise a bonding film between the substrates 101 and 102 and the bonding film has a thickness $h_b$. Preferably, the bonding film may be made from a dielectric substrate having characteristics of $\varepsilon_r$=3.52, tan δ=0.004 (e.g. the Rogers 4450F). The thickness $h_b$ may be substantially equal to 0.1 mm.

Figure 2:
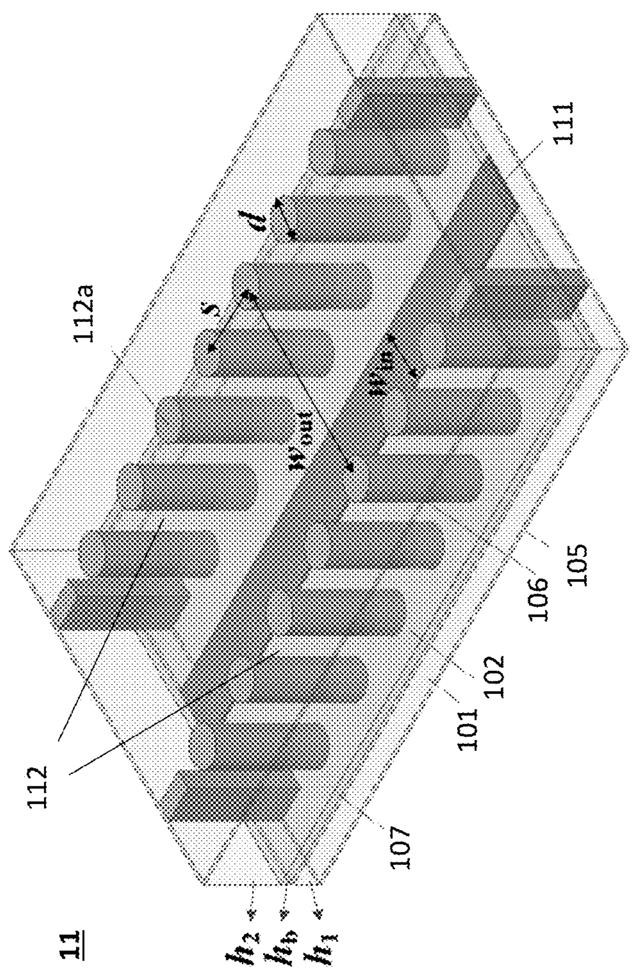
FIG. 2 shows more details about configuration of a ASICL feed of the antenna.

FIG. 2 shows more details about configuration of the ASICL feed 110. Referring to FIG. 2, the ASICL feed 110 may comprise a conductive signal line 111 formed on an upper surface 107 of the substrate 101; and two waveguiding walls 112 positioned along and at both sides of the signal line 111 respectively. Each of the waveguiding walls may comprise a row of conductive waveguiding vias 112*a* extending substantially perpendicularly through the substrates 101 and 102.

Figure 3:
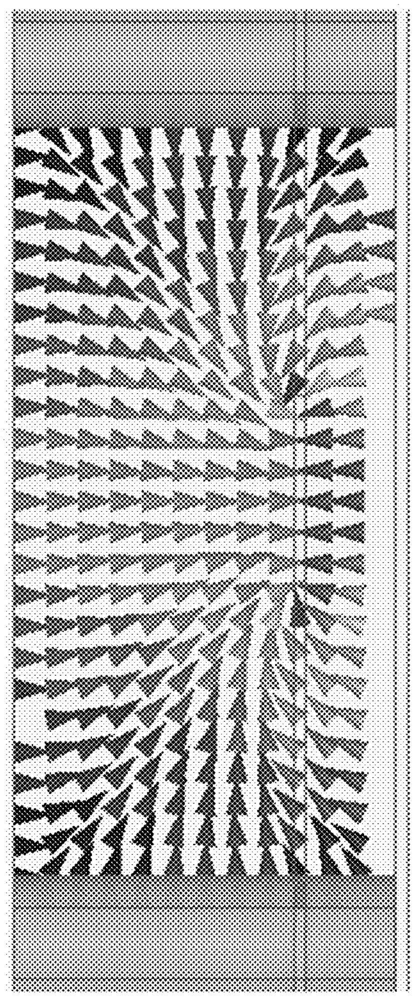
FIG. 3 shows cross-section electric field distribution in the ASICL feed.

Due to the asymmetric geometry, the cross-section electric field distribution of the ASICL as depicted in the FIG. 3 is similar to that of an MSL. In particular, the fundamental mode of an ASICL is the TEM mode and the first higher-order mode is TE10. The cut-off frequency of the first higher-order mode is 56.4 GHz, which is far away from the frequency range of interest.

Referring back to FIGS. 1A-1C and 2. The conductive signal line 111 may have a line width denoted as $w_{in}$. The two waveguiding walls 112 may form a waveguide having a waveguide width denoted as $w_{out}$. Within each wall, the waveguiding vias 112 may have a via-to-via spacing denoted as s. Each of the waveguiding vias 112*a* may have a cylindrical shape with a base diameter denoted as d.

Figure 4B:
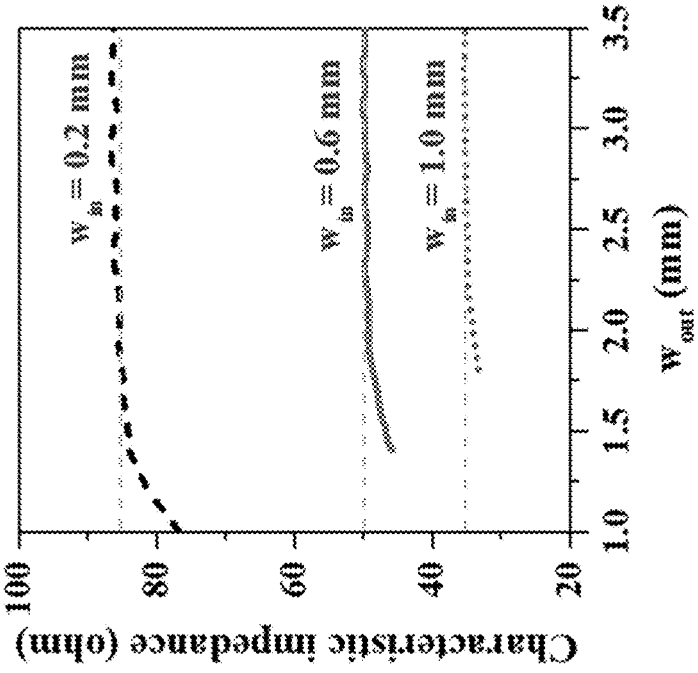
FIGS. 4A and 4B depict a CI-$w_{out}$ curve and a CI-$w_{in}$ curve illustrating measurement of CI values of the ASICL with different signal line widths $w_{in}$ and waveguide widths $w_{out}$, respectively.
Figure 4A:
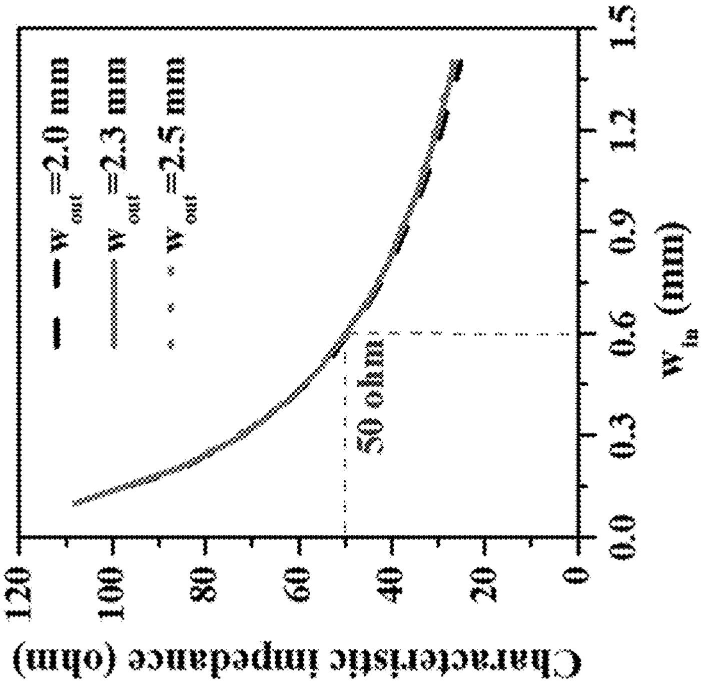

Preferably, the waveguide width $w_{out}$, which can also be defined as the spacing between the two waveguiding walls 112, may be chosen to have a good tolerance for achieving a stable characteristic impedance (CI) value. FIGS. 4A and 4B depict a CI-$w_{out}$ curve and a CI-$w_{in}$ curve illustrating measurement of CI values of the ASICL feed 110 with different values of $w_{in}$ and $w_{out}$, respectively. As shown in FIG. 4A, the waveguide width $w_{out}$ has little effect on the CI, unless the waveguiding walls are very close to the signal line 111. For examples, when the waveguide width $w_{out}$ is within the range from 2 to 2.5 mm, the CI-$w_{in}$ curve keeps identical. With the signal line width $w_{in}$ ranging from 0.1 to 1.4 mm, the CI varies from 25 to 108 ohms. When the signal line width $w_{in}$ is 0.6 mm, the CI equals to 50 ohms.

Figure 5A:
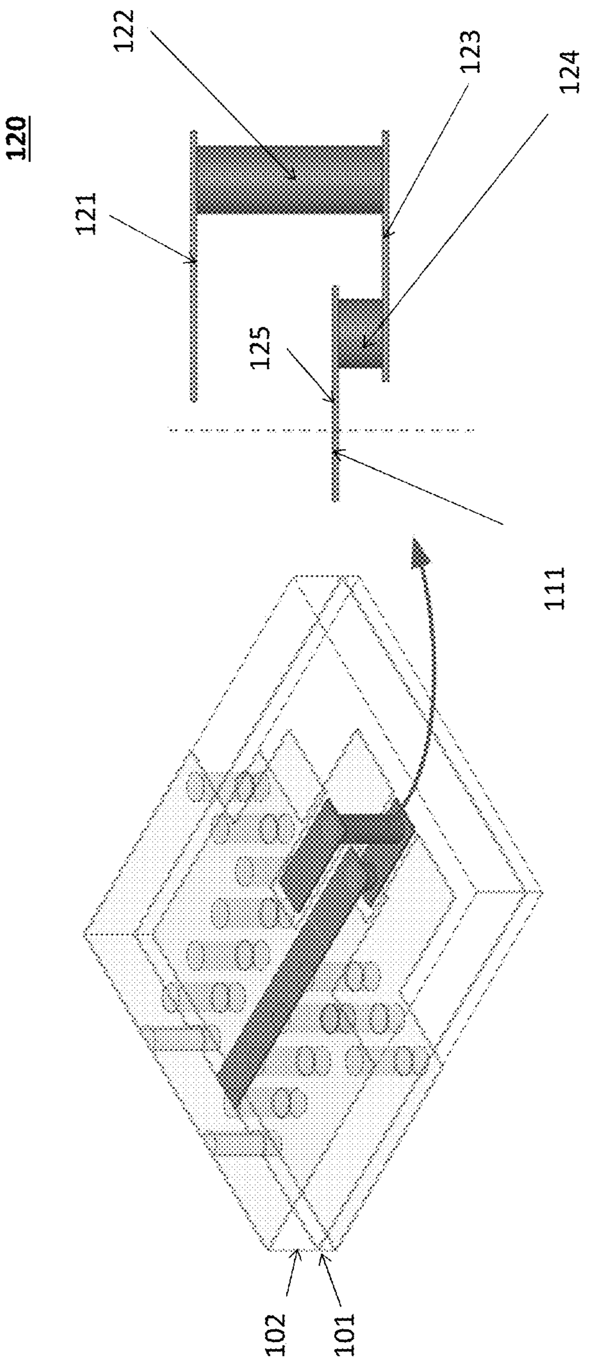
FIG. 5A shows more details about configuration of a probe of the antenna.

FIG. 5A shows more details about configuration of the probe 120. Referring to FIGS. 1A-1C and 5A. The probe 120 may have an upper horizontal conductive strip 121 formed on the upper surface of the substrate 102 and having a length denoted as $l_3$ (in FIG. 1B); a lower horizontal conductive strip 123 formed on the lower surface of the substrate 101 and having a length denoted as $l_2$ (in FIG. 1B); and a middle conductive strip 125 formed on an upper surface the substrate 101.

The probe 120 may further have a conductive via 122 extending substantially perpendicularly through the substrates 101 and 102 for connecting the upper conductive strip 121 to the lower conductive strip 123; and a conductive via 124 extending substantially perpendicularly through the substrate 101 for connecting the lower conductive strip 123 to the middle conductive strip 125. The middle conductive strip 125 may be connected to an extension from the conductive signal line 111 for providing connection between the probe 120 and the ASICL feed 110. As such, the upper horizontal conductive strip 121 and the conductive via 122 forms an Γ-shaped probe portion having a free end to act as a probe tip.

Figure 5B:
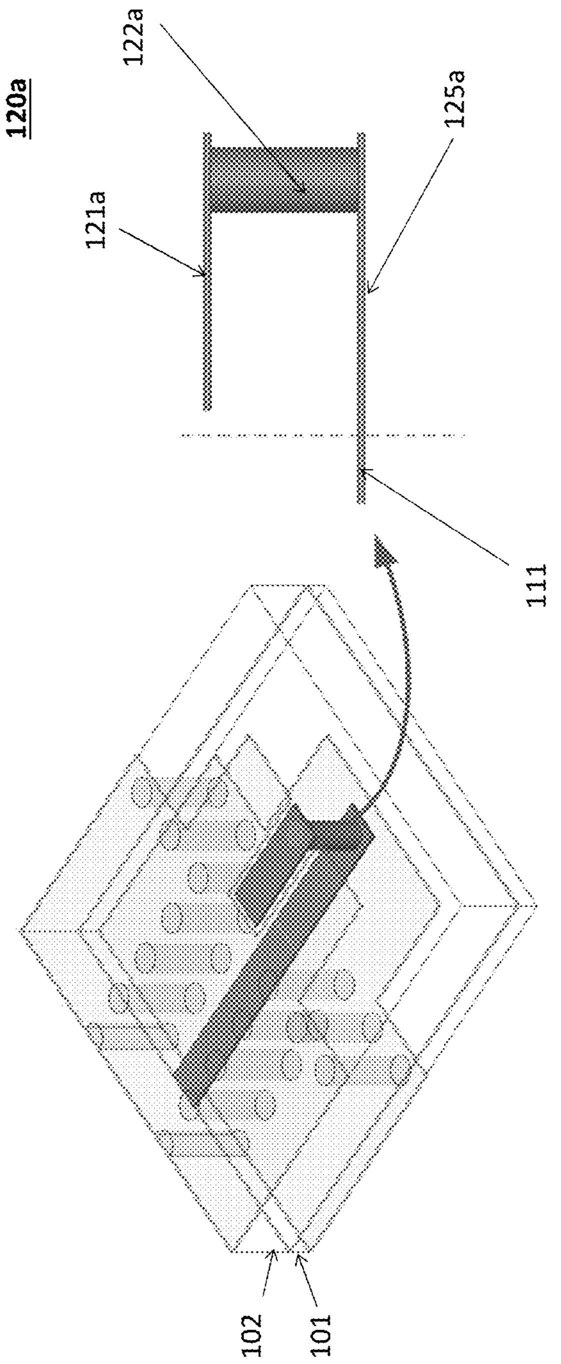
FIG. 5B shows an alternative configuration of the probe.

FIG. 5B shows an alternative configuration of the probe 120*a*. In this configuration, the probe 120*a* includes a Γ-shaped probe portion having an upper horizontal conductive strip 121*a* formed on the upper surface of the substrate 102; a lower horizontal conductive strip 125*a* formed on upper surface of the substrate 101; and a conductive via 122*a* extending substantially perpendicularly through the substrate 102 for connecting the conductive strip 121*a* and the lower horizontal conductive strip 125*a*. Similar to the configuration of probe 120, the lower horizontal conductive strip 125*a* is connected to an extension from the conductive signal line 111 providing connection between the probe 120 and the ASICL feed 110.

Figure 6:
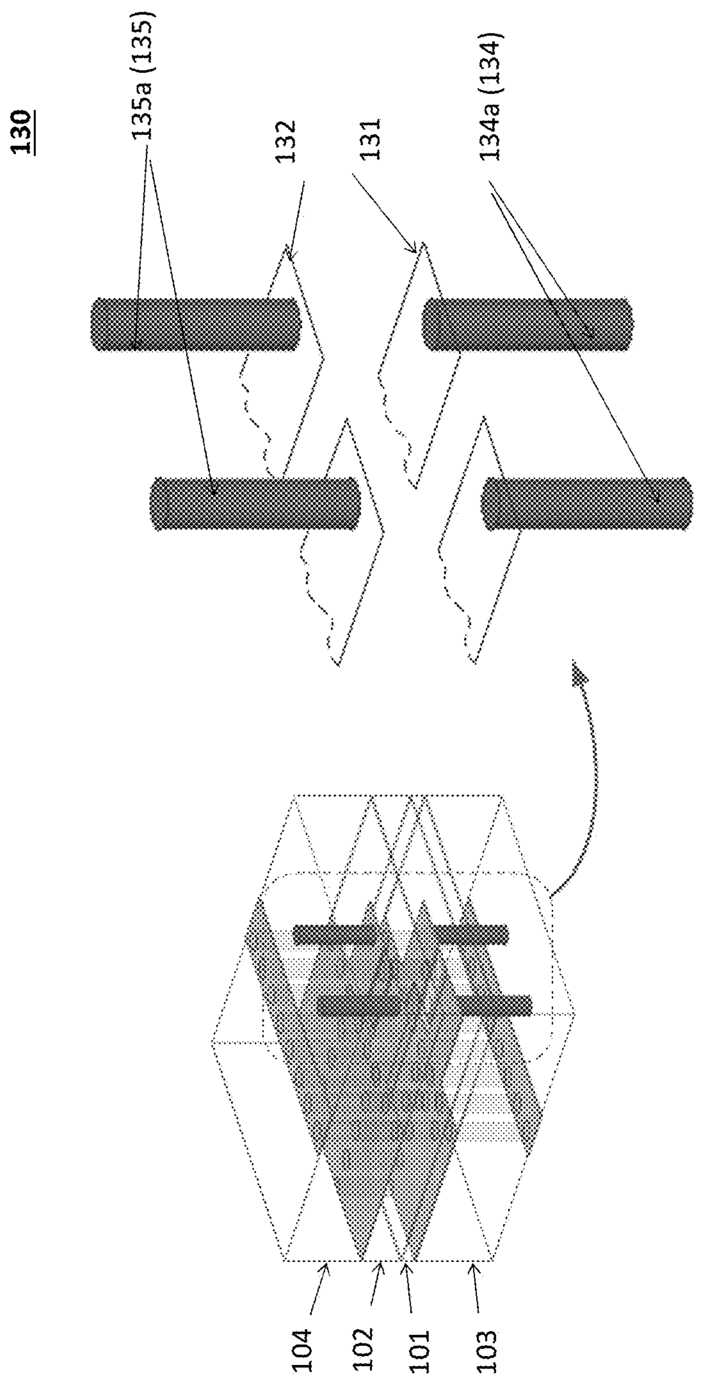
FIG. 6 shows more details about configuration the radiator.

FIG. 6 shows more details about configuration the radiator 130. Referring to FIGS. 1A-1C and 6A. The radiator 130 may comprise a pair of conductive planar parallel plates 131, 132, being shorted to each other at one edge and being open at another opposite edge, so as to form a shorted quarter-wave radiating patch antenna to act as a horizontal magnetic dipole source. The planar plate 131 may be extended from the lower ground plane 105 of substrate 101. The conductive planar plate 132 may be extended from the upper ground plane 106 of substrate 102. The planar parallel plates 131, 132 may be shorted by a set of conductive vias 133 (in FIG. 1A) configured to extend substantially perpendicularly from the ground plane 105 to the ground plane 106 through the substrates 101 and 102. Preferably, the conductive planar plates 131, 132 are identical in size. Each of the conductive planar plates 131, 132 has a length denoted as $l_a$ and a width denoted as $w_a$ respectively.

The planar parallel plates 131, 132 are coupled to the probe 120 and configured to radiate the electromagnetic energy from the opposite open edge as a magnetic dipole do when being excited by the probe 120. Preferably, the planar parallel plate 131 has a central slot region for accommodating the lower conductive strips 123 of the probe 120; and the planar parallel plate 132 has a central slot region for accommodating the upper conductive strip 121 of the probe 120.

The radiator 130 may further comprise two vertical dipoles, 134 and 135, connected and located at the open edges of the planar plates, 131 and 132, respectively. The vertical dipoles 134 and 135 are coupled to the probe 120 and configured to radiate the electromagnetic energy as electric dipoles do when being excited by the probe 120. The lower vertical dipole 134 includes a pair of conductive vias 134*a* positioned at both side of the probe 120 respectively and extending substantially perpendicularly from the parallel plate 131 through the substrate 103; and the upper vertical dipole 135 includes a pair of conductive vias 135*a* positioned at both side of the probe 120 respectively and extending substantially perpendicularly from the parallel plate 132 through the substrate 104. Each of the conductive vias 134*a* and 135*a* may have a diameter $d_2$ and a distance $d_1$ between its center from the center of the via 122 of the probe 120.

Figure 7B:
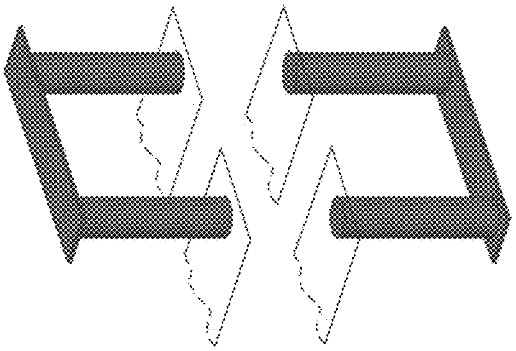
FIGS. 7A-7D FIGS. 7A-7D show various exemplary configurations for the vertical dipoles.
Figure 7D:
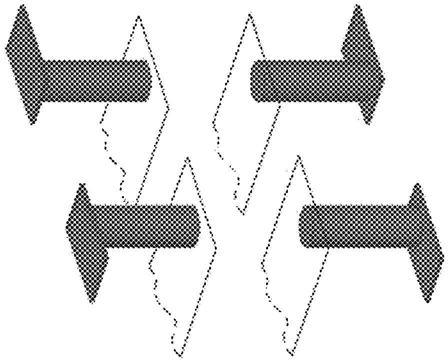
Figure 7A:
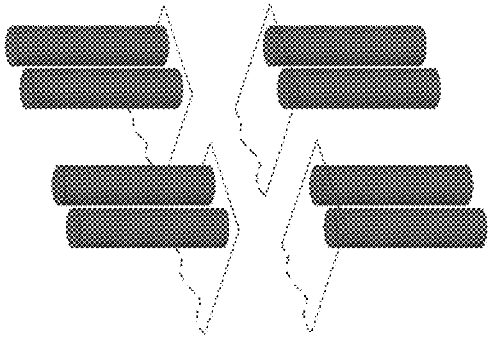
Figure 7C:
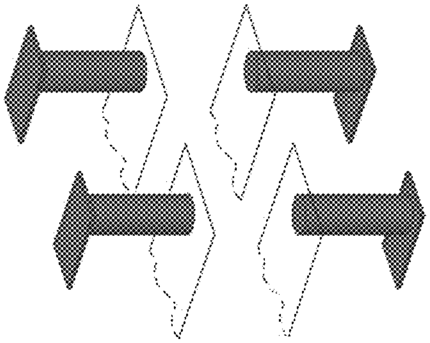

FIGS. 7A-7D show various exemplary configurations for the vertical dipoles. Each vertical dipole may have more than one pairs of vias as shown in FIG. 7A. Extra strip portions can be included for the vertical dipole dipoles as shown in FIGS. 7B-7D such that the height of the vias for dipoles may decrease accordingly.

Figure 8:
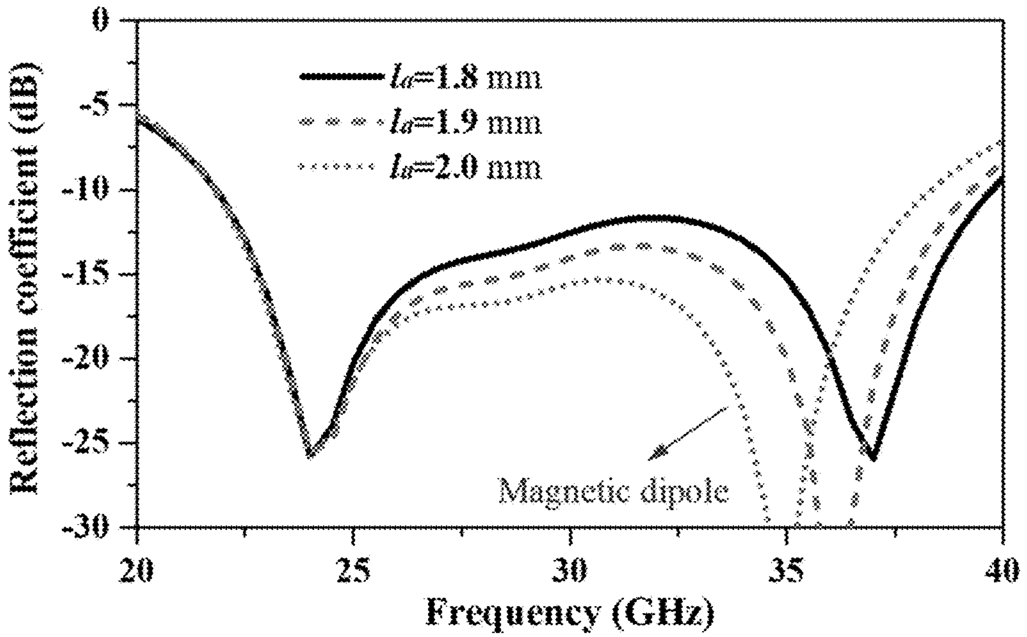
FIG. 8 presents the simulated reflection coefficient of the antenna with different radiating plates lengths $l_a$.

FIG. 8 presents the simulated reflection coefficient of the antenna with different radiating plate lengths $l_a$. The upper resonant frequency decreases while the lower one keeps unchanged with increasing $l_a$. Thus, a conclusion can be made that the upper resonant frequency is due to the magnetic dipole.

Figure 9:
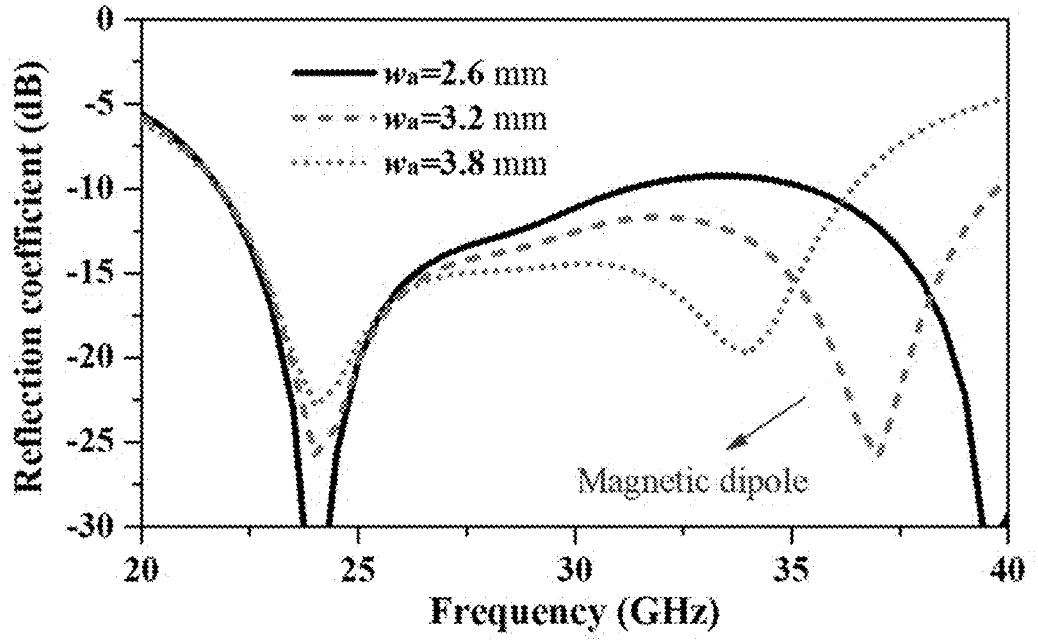
FIG. 9 presents the simulated reflection coefficient with different radiating plate widths $w_a$.

The resonance of the magnetic dipole may also be affected by the radiating plate width $w_a$. FIG. 9 presents the simulated reflection coefficient with different radiating plate $w_a$. It turns out that the upper resonant frequency decreases with increasing $w_a$.

Figure 10:
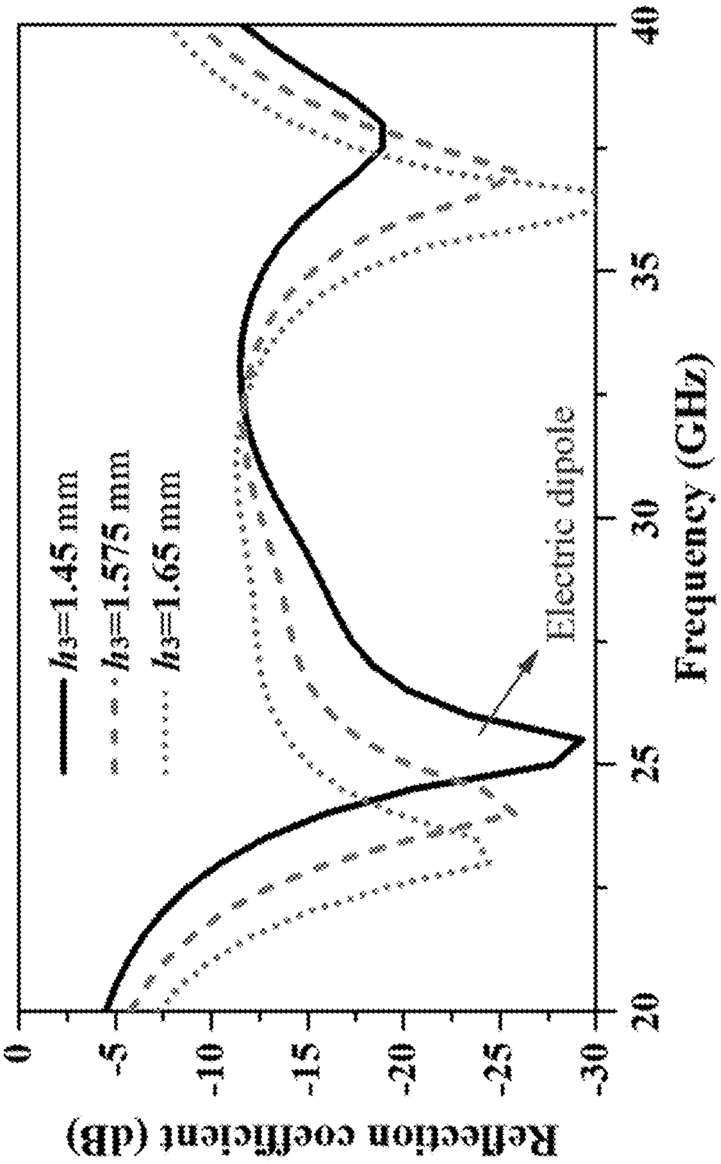
FIG. 10 presents the simulated reflection coefficient with different substrate thicknesses $h_3$.

Referring back to FIGS. 1A-1C. The length of the electric dipole may be determined by the thickness $h_3$ of the substrates 103, 104. FIG. 10 presents the simulated reflection coefficient with different thicknesses $h_3$. The lower resonant frequency decreases with increasing $h_3$. At the same time, the upper resonant frequency remains nearly unmoved. It is also shown that the lower resonant frequency is determined by resonance of the electric dipole.

Figure 11A:
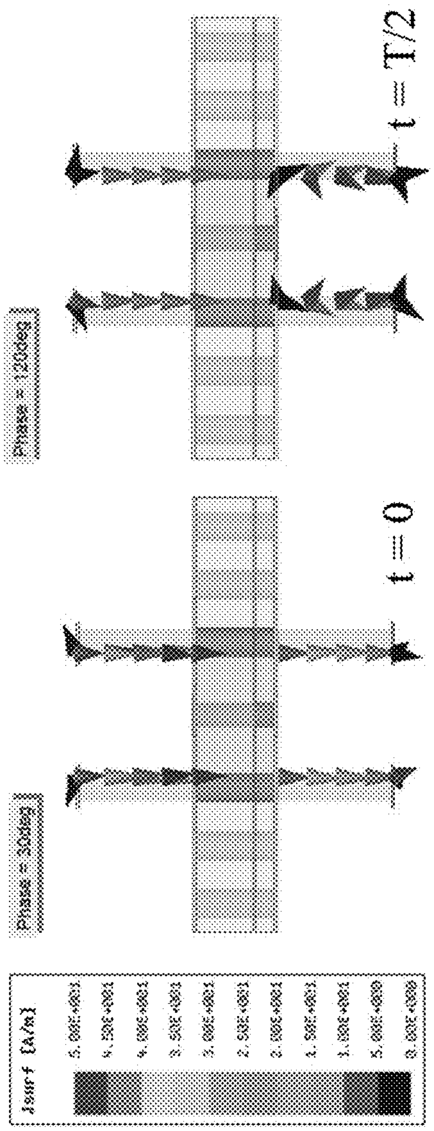
FIGS. 11A and 11B show the current distribution ($J_{surf}$), on the two pair of radiating vias and the electric field distribution at the antenna slot aperture at t=0 and t=T/4 respectively.
Figure 11B:
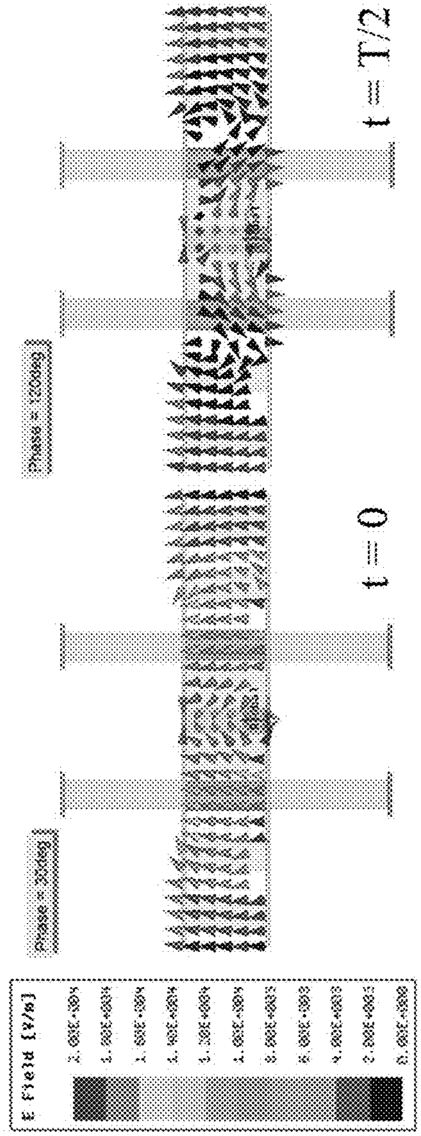

FIGS. 11A and 11B show the current distribution ($J_{surf}$), on the two pair of radiating vias and the electric (E) field distribution at the antenna slot aperture (shorted quarter-wave radiating patches) at t=0 and t=T/4 respectively, where T is the time period, as analyzed separately with the radiation boundary at all outer sides. At the moment of t=0, strong dipole-like currents are excited on the radiating vias. At the same time, a strong electric field is also excited at the antenna slot aperture, which is equivalent to a horizontal magnetic current. At the moment of t=T/4, both the currents on the radiating vias and the electric fields at the antenna slot aperture get weak. Therefore, a pair of orthogonal electric dipole and magnetic dipole are excited simultaneously. Namely, an ME dipole is excited as expected.

Figure 12:
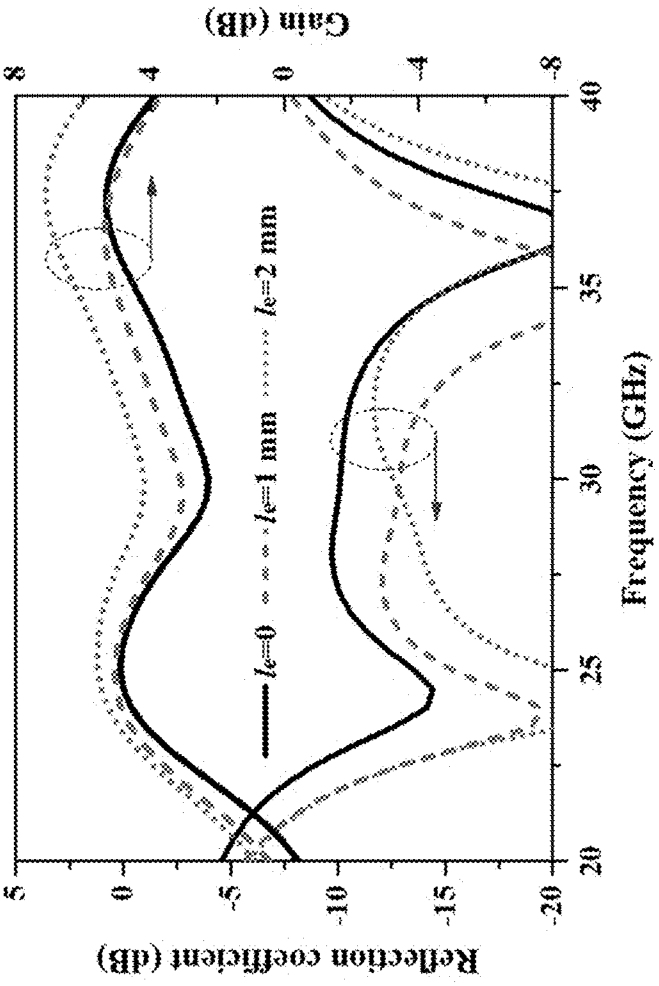
FIG. 12 presents the simulated reflection coefficient and gain with different substrate extension lengths $l_e$.

Referring back to FIGS. 1A-1C. Beyond the radiating patches formed by the conductive plates 131 and 132, the substrates 101-104 may be extended for a length $l_e$ for improving the impedance matching and enhance the gain of the antenna. FIG. 12 presents the simulated reflection coefficient and gain with different lengths of the substrate extension length $l_e$. By choosing $l_e$=2 mm, both the impedance matching and antenna gain can be improved remarkably. On the other hand, the two resonant frequencies show insignificant shifts.

Figure 13:
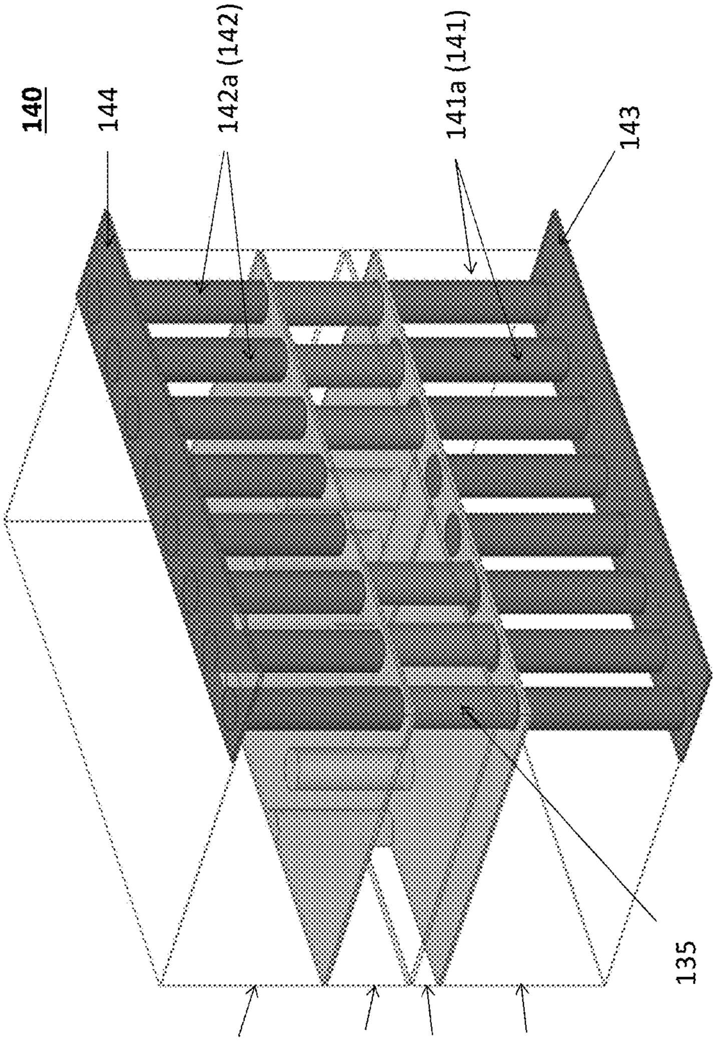
FIG. 13 shows more details about configuration of a reflector of the antenna.

FIG. 13 shows more details about the reflector 140. Referring to FIGS. 1A-1C and 13, the reflector 140 may include a lower reflecting wall 141 extending from an upper surface of the substrate 103 and an upper reflecting wall 142 extending from a lower surface of the substrate 104. The lower reflecting wall 141 includes a row of lower reflecting vias 141*a* extending substantially perpendicularly through the substrate 103. The upper reflecting wall 142 includes a row of upper reflecting vias 142*a* extending substantially perpendicularly through the substrate 104. Each of the reflecting vias 141*a*, 142*a* may have a diameter do.

The reflector 140 may further include a lower reflecting strip 143 placed on a bottom side of the lower reflecting wall 141 and an upper reflecting strip 144 placed on a top side of the upper reflecting wall 142.

Figure 14A:
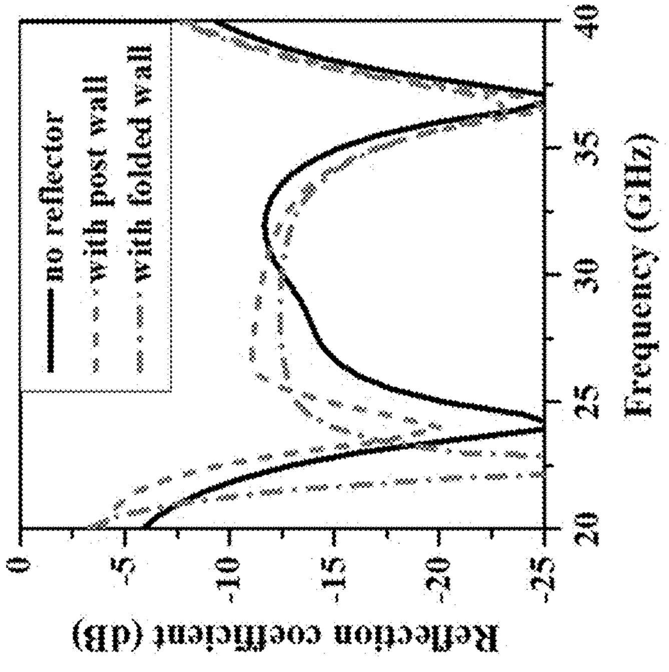
FIGS. 14A-14C presents the reflection coefficients, front-to-back ratios (FBRs) and gains of the antenna in three different cases: no reflecting wall, with the reflecting wall and with the reflecting strips placed on the reflecting wall.
Figure 14B:
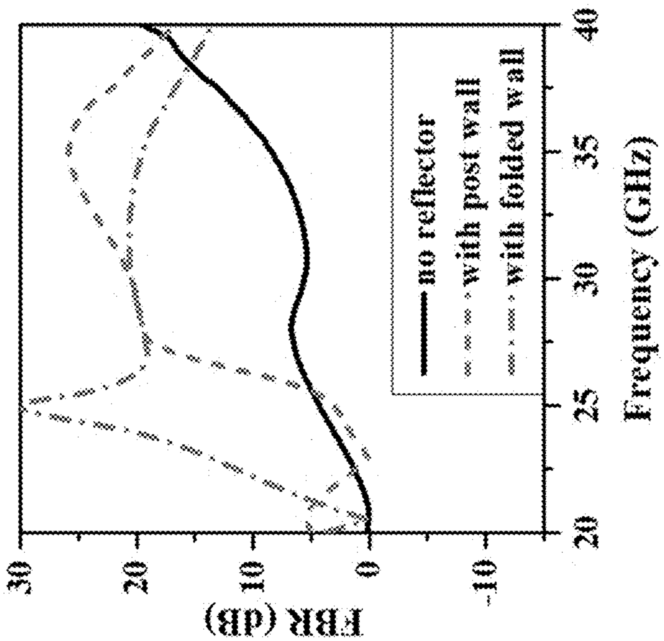
Figure 14C:
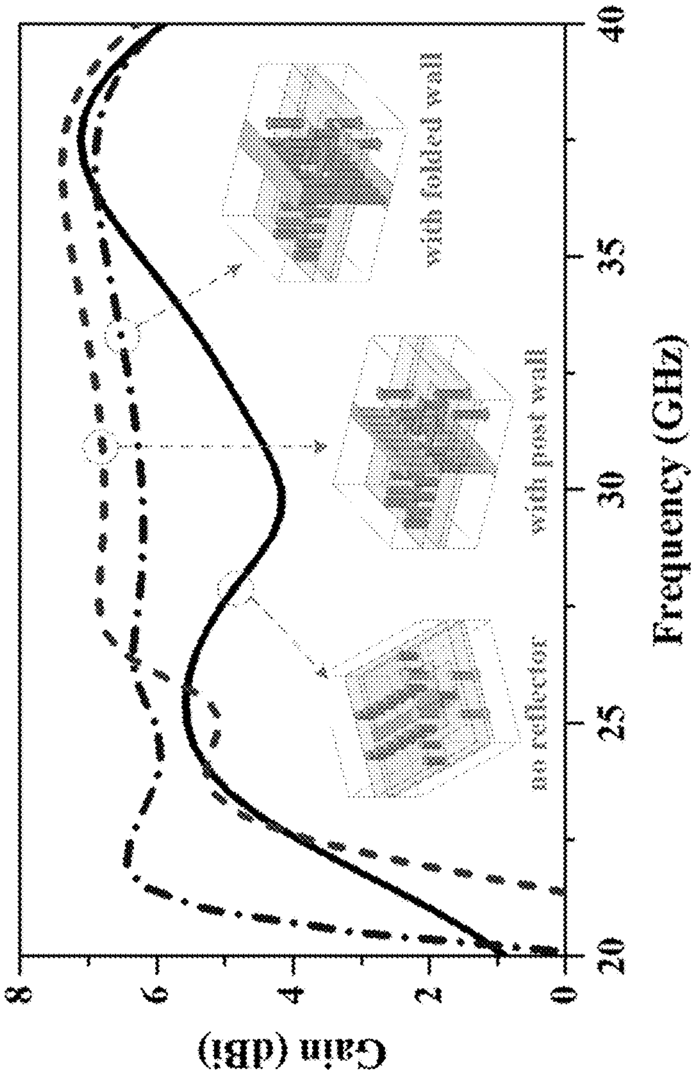
Figures 15A, 15B, 15C, 15D:
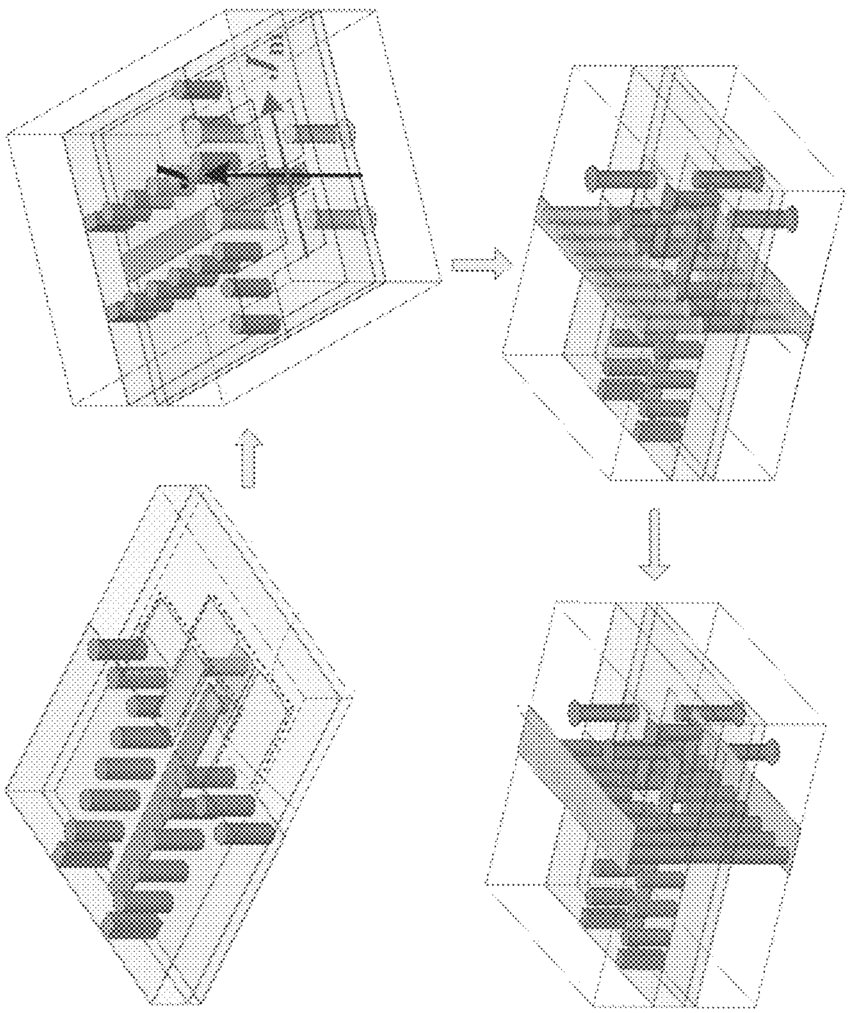
FIGS. 15A-15D show a simplified fabrication procedure of an antenna according to one embodiment of the present invention.

FIGS. 14A-14C presents the reflection coefficients, front-to-back ratios (FBRs) and gains of three different cases: no reflecting wall, with the reflecting wall and with the reflecting strips placed on the reflecting wall (or so-called folded reflecting wall). Referring to FIG. 14A, the three curves for the reflection coefficient are almost same. Referring to FIG. 14B, for the FBR, by adding the reflecting wall, the FBR is improved significantly over a wide frequency band. Referring to FIG. 14C, by adding the reflecting strips 143, 144 (equivalent to folding the wall with a suitable length, $l_{volt}$), the FBR at the lower frequency band is further improved. Furthermore, owning to the reflector 140, the gain is enhanced remarkably. And by properly folding the reflecting walls, the gain is also stabilized over the operating band.

FIGS. 15A-15D show a simplified fabrication procedure of an antenna according to one embodiment of the present invention. Firstly, referring to FIG. 15A, the ASICL-based feed structure, consisting of a first substrate and a second substrate, are fabricated together with the help of a bonding layer. At an open end of the ASICL feed, a center conductive signal line is extended out slightly and then connected to a Γ-shaped probe through a conductive blind hole (or conductive via) in a first substrate. The central parts of an upper ground plane of the second substrate and the lower ground plane of the first substrate are extended with an identical length. The extended ground planes are electrically shorted with each other to form a pair of shorted quarter-wave patches. For example, the extended ground planes may be connected with each other through conductive vias at one end. Secondly, referring to FIG. 15B, a third substrate and a fourth substrate are fabricated separately. Then, they are fixed to the ASICL feed (e.g. by Nylon screws). Two pairs of radiating vias are added at the two sides of the upper and lower ground planes. Thirdly, referring to FIG. 15C, two rows of reflecting vias forming a reflecting wall are added to serve as a reflector. Finally, referring to FIG. 15D, the reflecting wall is effectively folded by adding the metallic (e.g. copper) strips.

Figure 16:
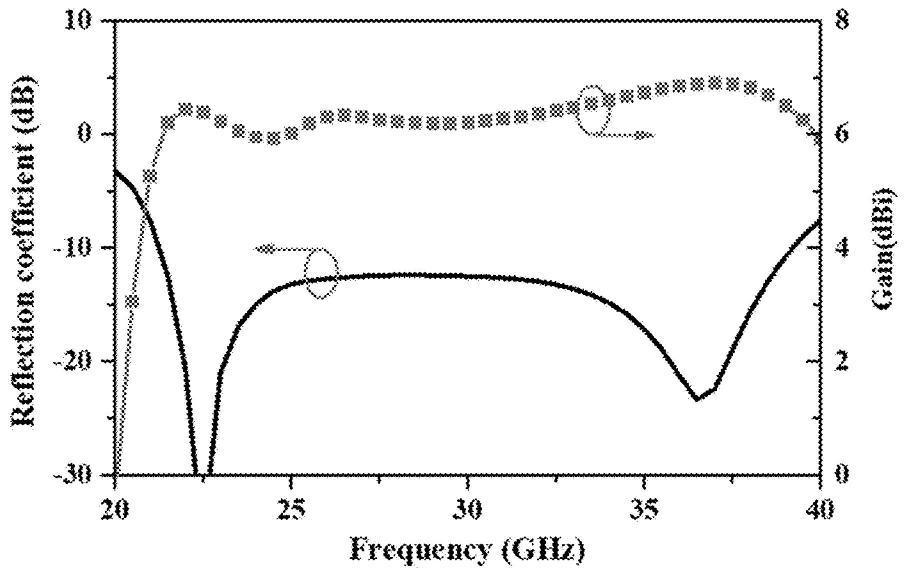
FIG. 16 shows simulated reflection coefficient (S11) and gain of antenna.

The simulated reflection coefficient (S11) and gain of the antenna are presented by FIG. 16. The simulated impedance bandwidth is 59.4% (21.3 to 39.3 GHz) with $|S11|<-10$ dB. Within this operating band, the antenna gain varies from 5.8 to 6.9 dBi, with a variation of 1.1 dB.

Figure 17:
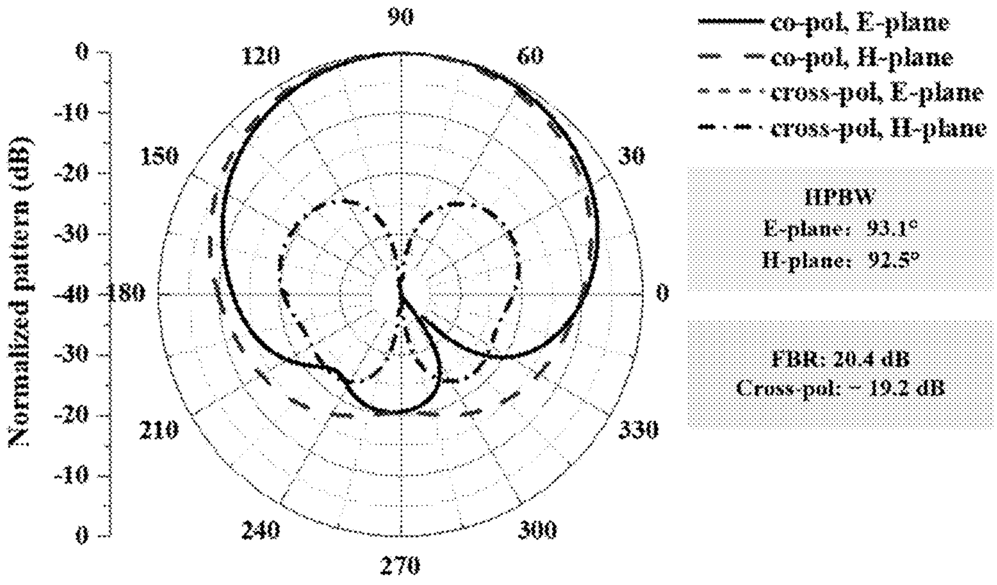
FIG. 17 shows normalized radiation patterns of the antenna at 30 GHz.

Normalized radiation patterns at 30 GHz are illustrated in FIG. 17. The Co-polarization patterns in E-plane and H-plane are almost identical with a half-power beamwidth (HPBW) of 93.1° and 92.5°, respectively. The cross-polarization and back radiation levels are below −19.2 dB and −20.4 dB, respectively.

According to some embodiments of the present invention, a fixed beam antenna array may be constructed with a N number of the millimeter-wave end-fire magneto-electric dipole antenna 10 of FIGS. 1A-1C; and an ASIC-based 1-to-N power divider configured to act as a feed network connecting an input port to the N number of the antenna 10. The ASIC-based 1-to-N power divider may be formed by cascading a N−1 number of 1-to-2 power dividers, while $N=2^M$, where M is an integer.

Figure 18:
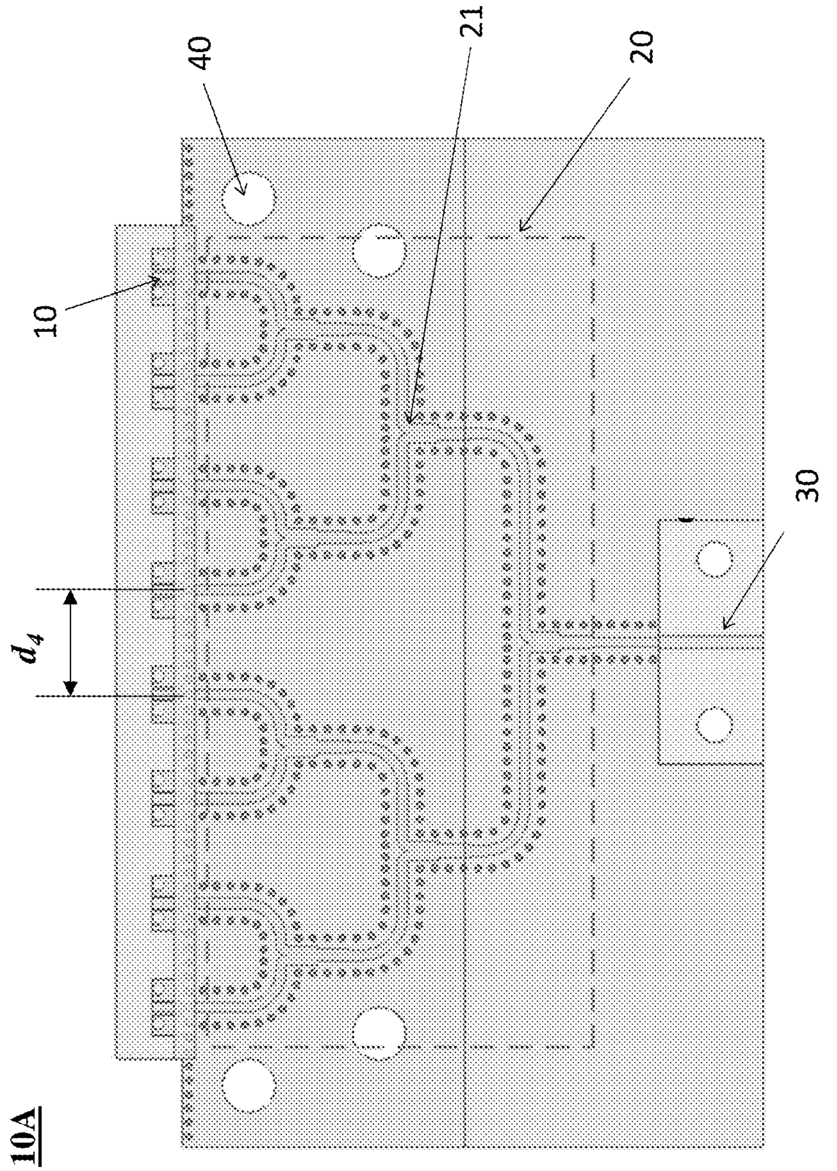
FIG. 18 illustrate a top view of a 1×8 linear fixed beam antenna array according to one embodiment of the present invention.

FIG. 18 illustrate a top view of a 1×8 linear fixed beam antenna array 10A according to one embodiment of the present invention. The 1×8 linear fixed beam antenna array 10A1 may have an antenna spacing $d_4$. Preferably, the antenna spacing $d_4$ is equal to $0.6\lambda_0$, where $\lambda_0$ is a wavelength at a central operating frequency. For example, for the center frequency of 30 GHz, the antenna spacing $d_4$ may be equal to 6 mm. With this antenna spacing, the mutual coupling between different antennas 10 is weak and has little effect on the array performance. A 1-to-8 ASICL power divider 11 is provided as the feed network by cascading seven 1-to-2 dividers. At the input end, an ASICL-to-MSL transition may be introduced for the power input via an end-launch connector 30. Several holes 40 are located at two sides to fix the multiple PCBs.

Figure 19:
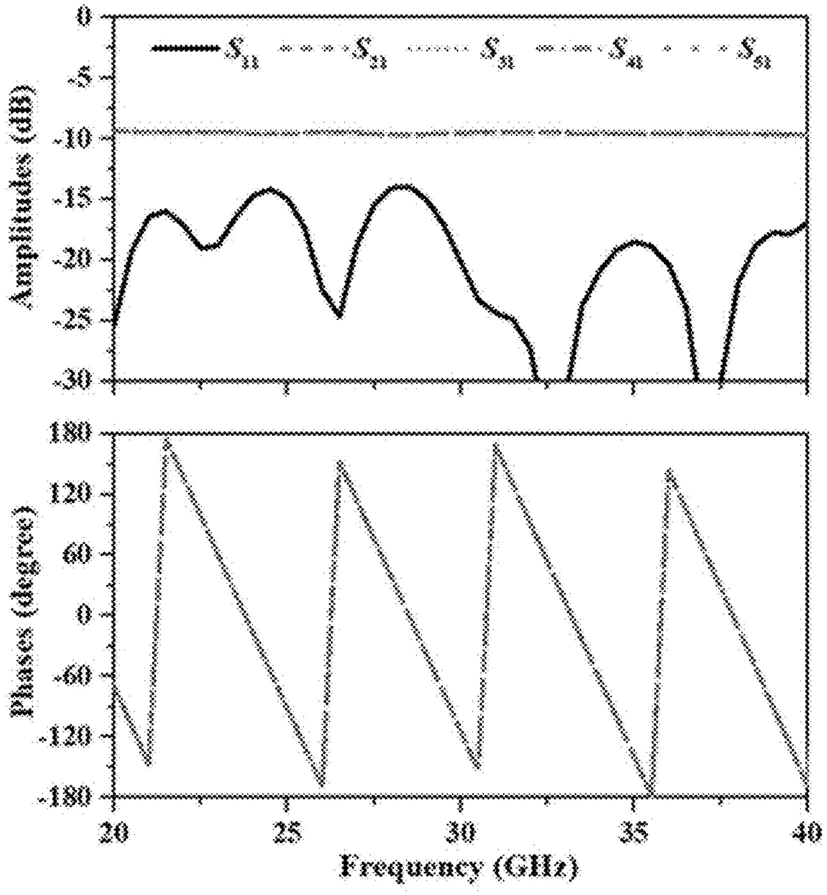
FIG. 19 presents the simulated S-parameters of the 1-to-8 divider according to the present invention.

FIG. 19 presents the simulated S-parameters of the 1-to-8 divider 20 according to the present invention. The amplitude of S11 is smaller than −14 dB within the band from 20 to 40 GHz. Transmission coefficients from the input port to different outputs keep around −9.53 dB with insignificant differences. The phases at different outputs are identical. Additionally, at the input port, the ASICL transits to a 50-ohm MSL directly, only by partially truncating the 2nd substrate and the upper ground plane.

Figure 20:
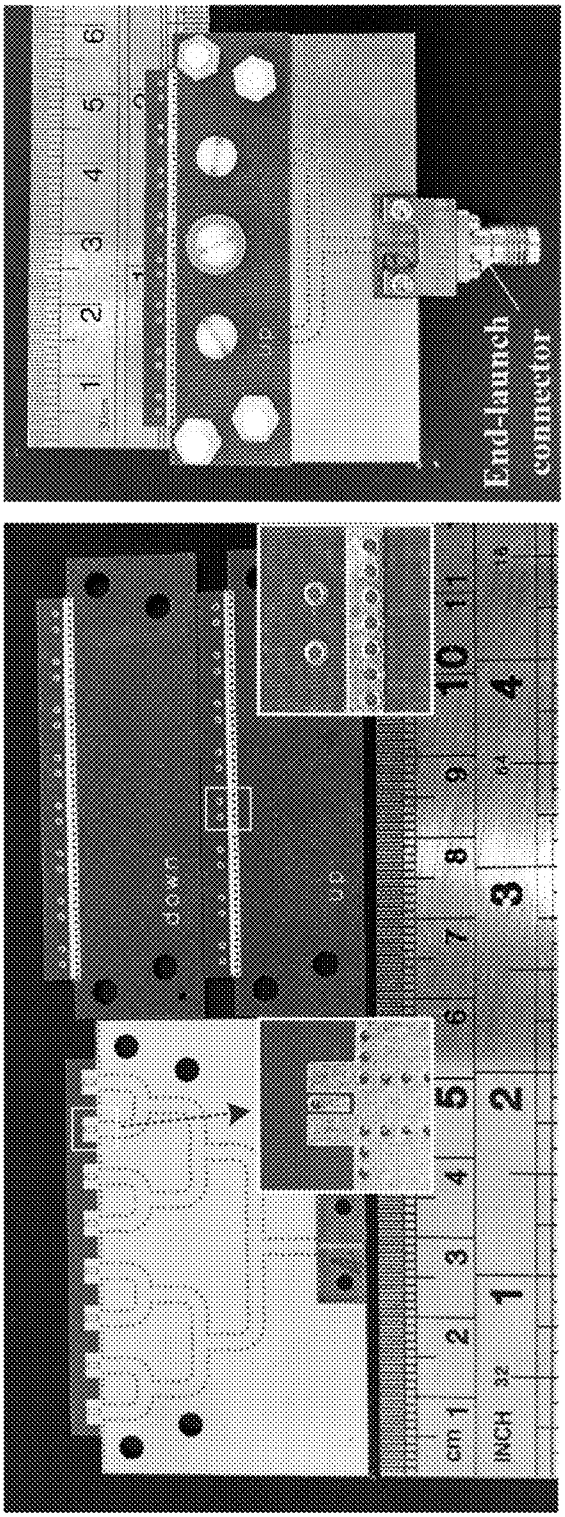
FIG. 20 presents an exemplary prototype of the 1×8 fixed beam antenna array of FIG. 16.

FIG. 20 presents an exemplary prototype of the 1×8 fixed beam antenna array 10A of FIG. 18. The S-parameters and radiation performances of the array are measured by an Agilent Vector Network Analyzer (E8361A) and the far-field test system, respectively.

Figure 21:
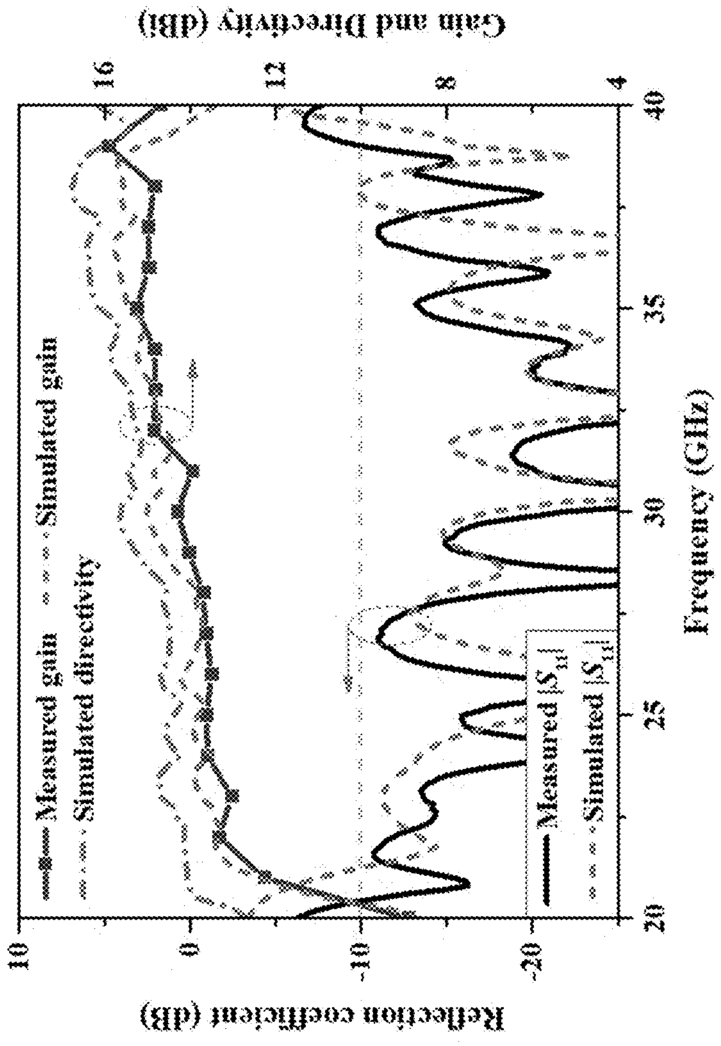
FIG. 21 presents the measured and simulated reflection coefficients and gains, and the simulated directivity, of the exemplary prototype of 1×8 antenna array.

FIG. 21 presents the measured and simulated reflection coefficients and gains, and the simulated directivity, of the exemplary prototype of 1×8 antenna array. The measured $|S11|$ is smaller than −10 dB across the band of 20.5-39 GHz, which is very close to the simulated result of 21-39.5 GHz. The measured impedance bandwidth is 62%. The measured and simulated gains are also in a good agreement. The gain increases slowly with the frequency increasing. The measured gain ranges from 12.3 to 15.9 dBi within the operating band. By comparing the measured gain and the simulated directivity, an average radiation efficiency of 79% is obtained.

Figure 22A:
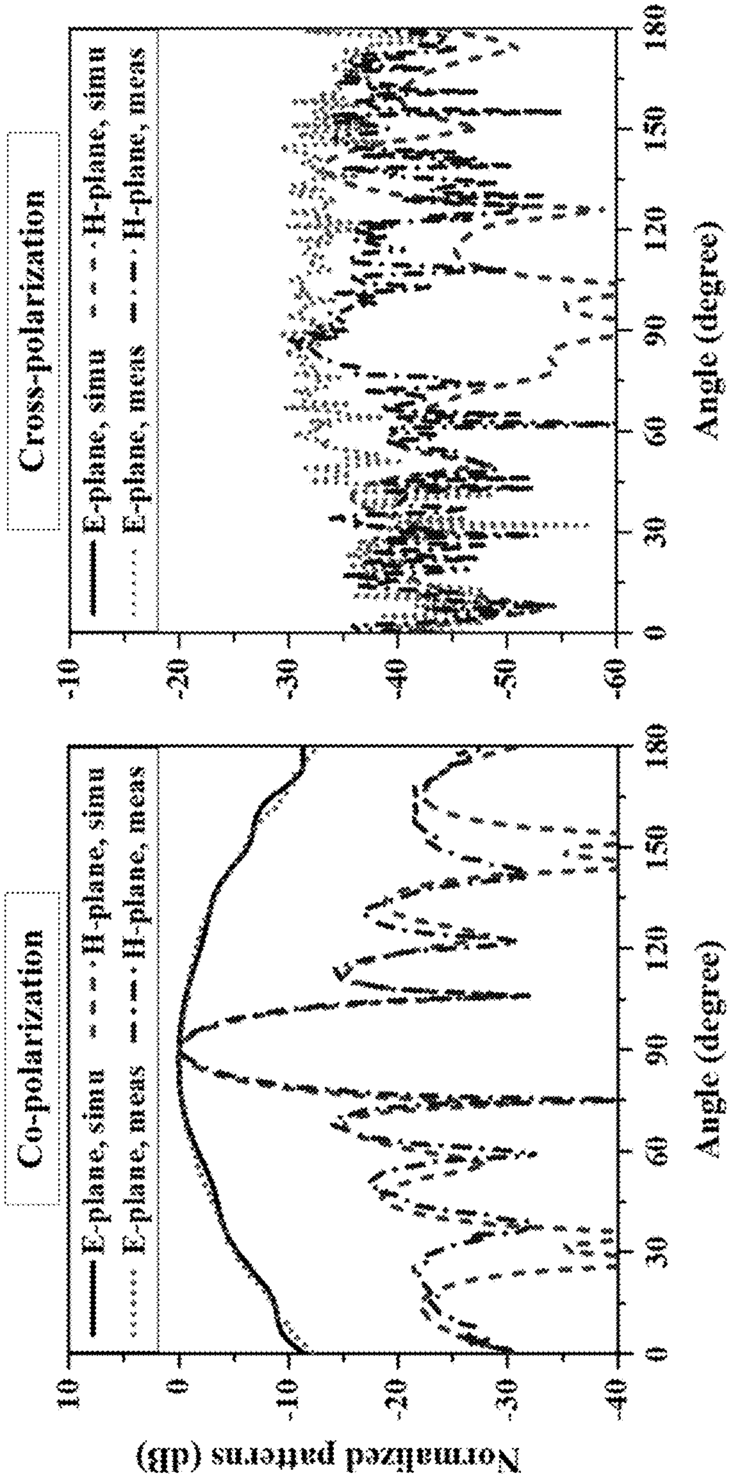
FIGS. 22A-22C presents the normalized radiation patterns of the exemplary prototype of 1×8 antenna array at 23, 30 and 37 GHz, respectively.
Figure 22B:
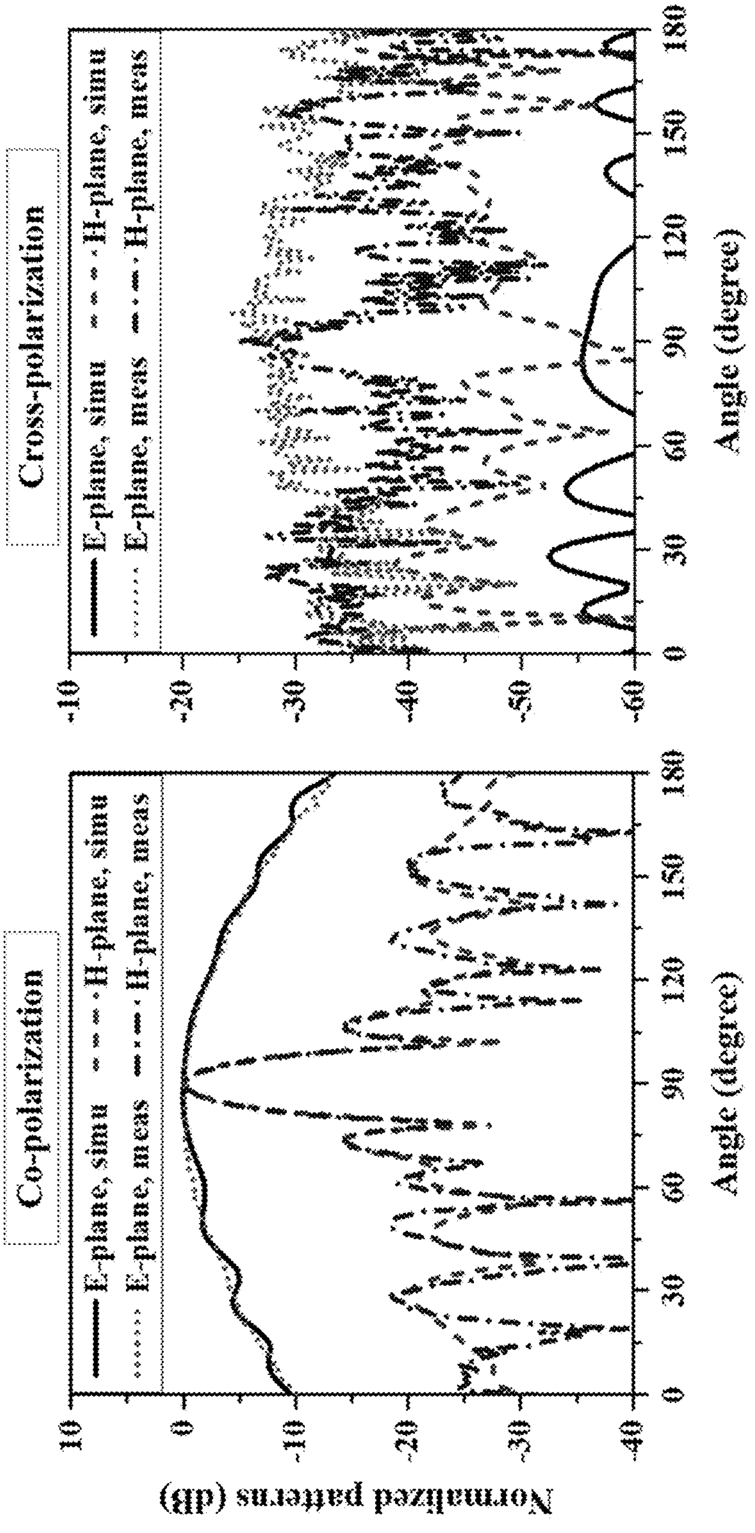
Figure 22C:
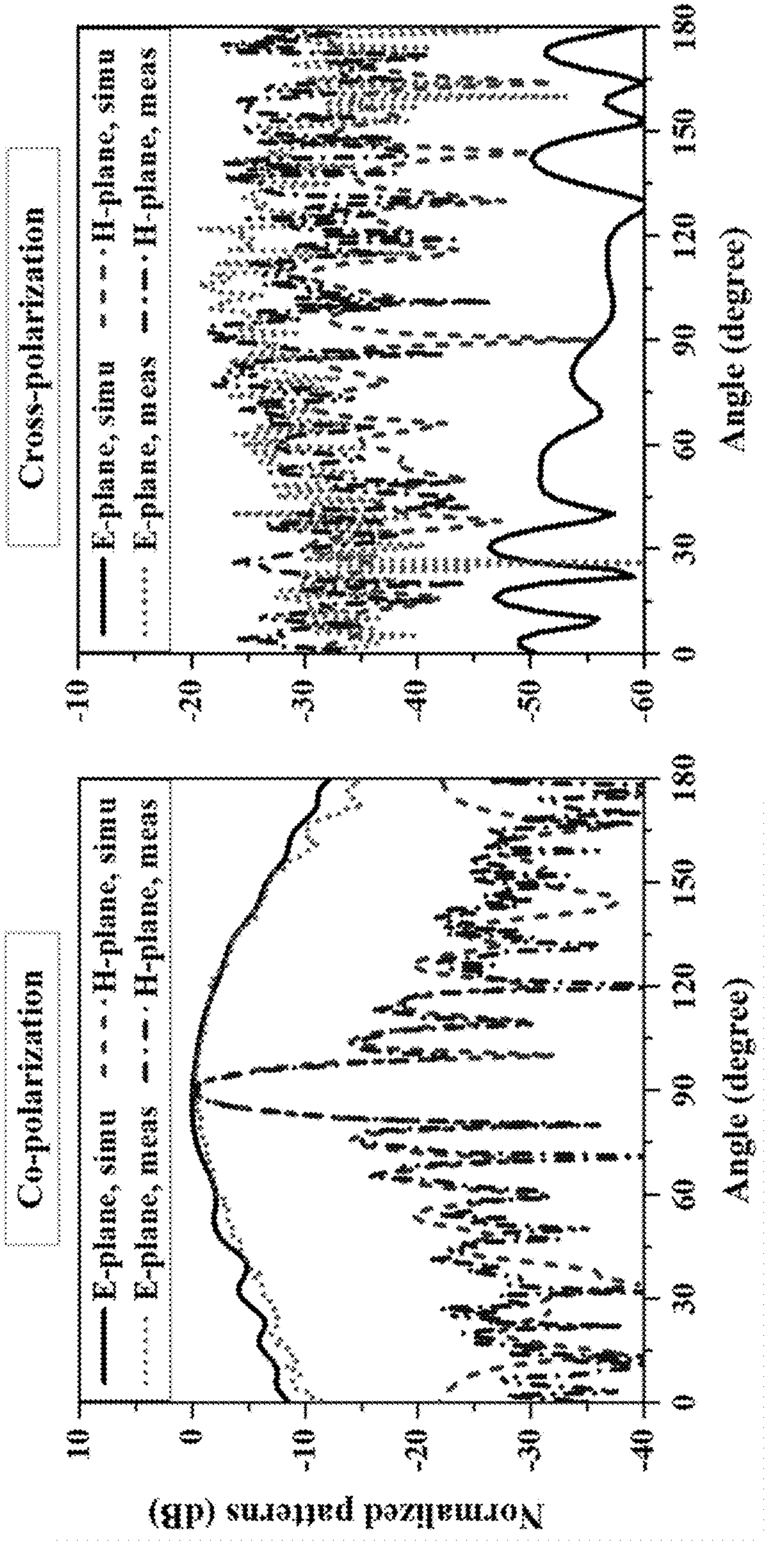

FIGS. 22A-22C presents the normalized radiation patterns of the exemplary prototype of 1×8 antenna array at 23, 30 and 37 GHz. For co-polarization patterns (as shown in FIGS. 22A-22C, left columns), good agreements are achieved between the measurement and the simulation at different frequencies. A narrow beam is obtained in H-plane because of the linear array arrangement. The measured side lobe level keeps below −13 dB. For cross-polarization patterns (as shown in FIGS. 22A-22C, right columns), the measured cross polarizations are below −25 dB at 23 GHz and 30 GHz, and below −20 dB at 37 GHz.

According to other embodiments of the present invention, a multi-beam antenna array may be constructed with a N number of the millimeter-wave end-fire magneto-electric dipole antenna 10 of FIGS. 1A-1C; and an ASIC-based N-by-N Butler matrix configured to act as a feed network connecting a N number of input ports to the N number of the antenna elements. The ASIC-based N-by-N Butler matrix may consist of four 3-dB hybrid couplers, two crossovers, two −45° phase shifters, and two 0° phase shifters. All of these phase shifters are in terms of the phase delay introduced by the crossover. Each component for this Butler matrix is carefully designed with a wideband operation.

Figure 23:
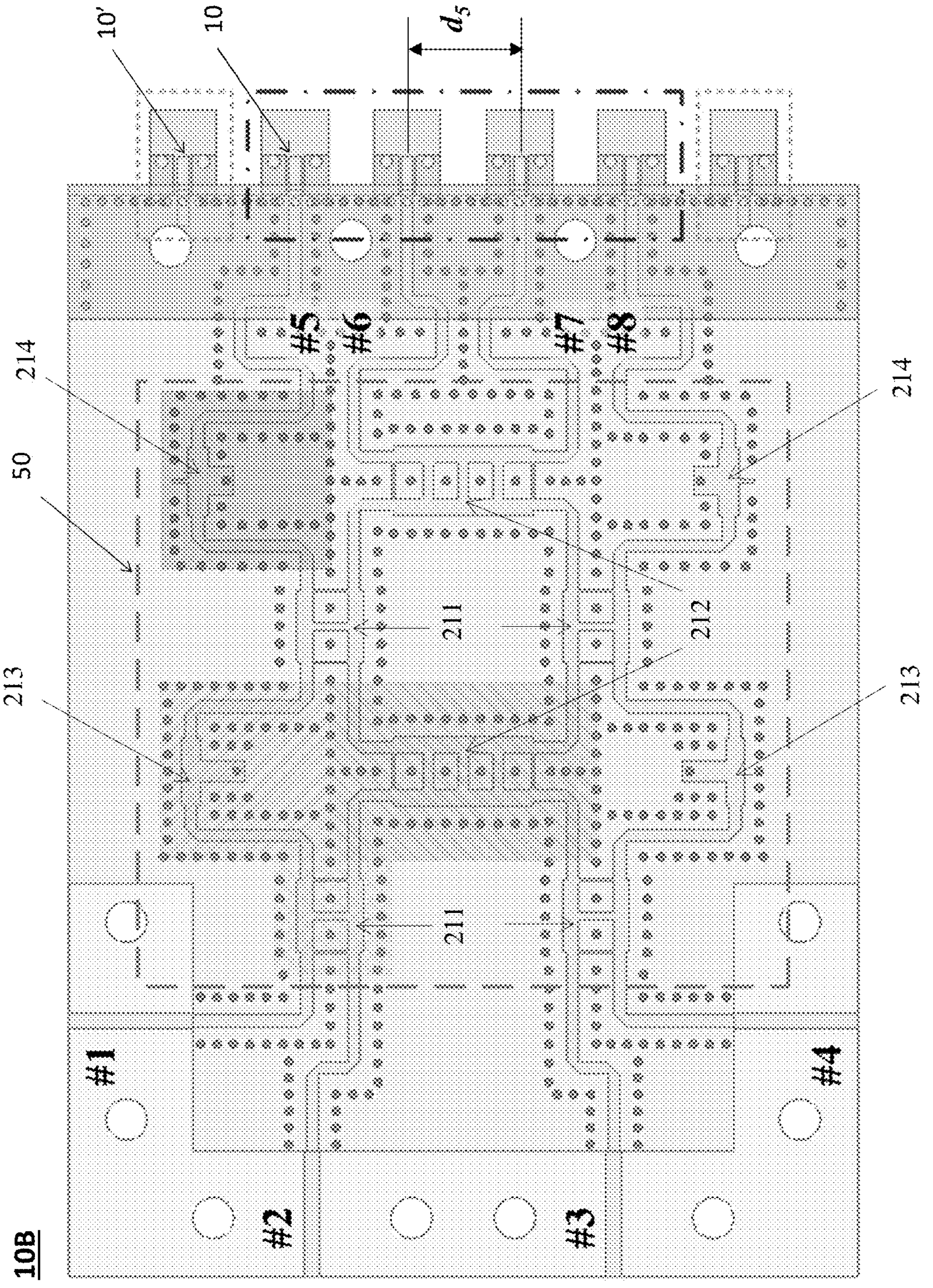
FIG. 23 illustrates a top view of a multi-beam antenna array including a 1×4 linear array of antenna according to one embodiment of the present invention.

FIG. 23 illustrates a top view of a multi-beam antenna array 10B including a 1×4 linear array of antenna 10 coupled with an ASIC-based 4×4 Butler matrix 50. The multi-beam antenna array 10B may have an antenna spacing $d_5$. Preferably, the antenna spacing $d_5$ is equal to 0.544, where $\lambda_0$ is a wavelength at a central operating frequency. For example, for the center frequency of 30 GHz, the antenna spacing $d_5$ may be equal to 5.4 mm for reasonably low mutual coupling.

The ASIC-based 4×4 Butler matrix 50 may consist of four 3-dB hybrid couplers 211, two crossovers 212, two −45° phase shifters 213, and two 0° phase shifters 214.

In addition, a dummy antenna 10' may be added at each side of the antenna array in order to reduce the influence of edge effect. The dummy port is left to be opened since extremely low energy arrives at it. Moreover, the substrates may be grooved (not shown) to for shifting suspect frequency and enlarging the operating bandwidth.

Figure 24A:
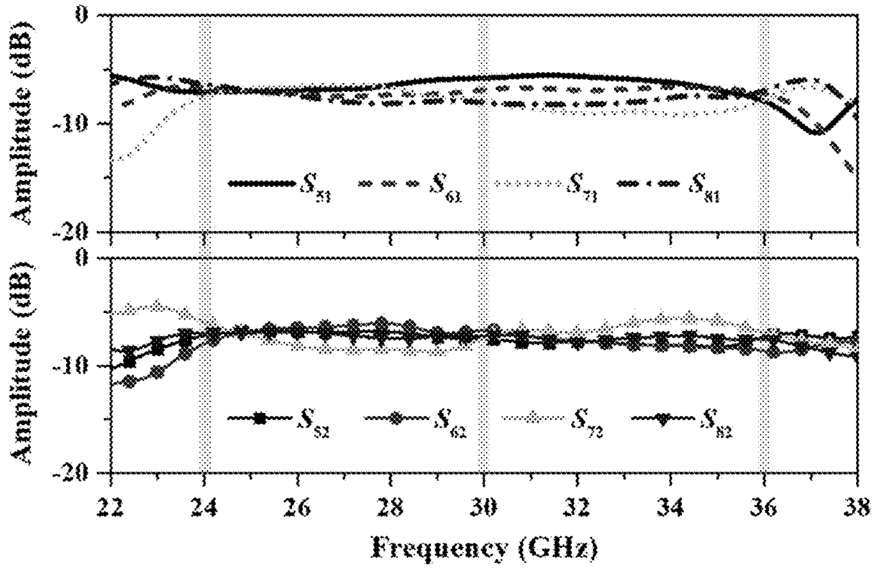
FIGS. 24A and 24B present the simulated amplitudes and phases of the S-parameters of a 4×4 Butler matrix.
Figure 24B:
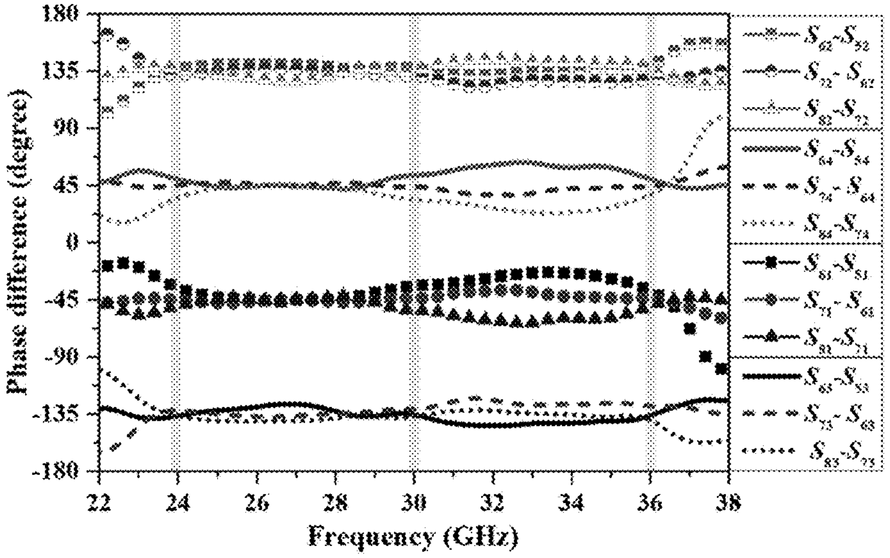

FIGS. 24A and 24B present the simulated amplitudes and phases of the S-parameters of the 4×4 Butler matrix 50. Overall, reasonably good amplitude and phase responses are achieved over a wide frequency band, although the results at near 33 GHz are not such perfect. At the lower (24 GHz), center (30 GHz) and upper (36 GHz) frequencies, the worst amplitude unbalance is 2.2 dB and the biggest phase error is 11 degrees.

Figure 25:
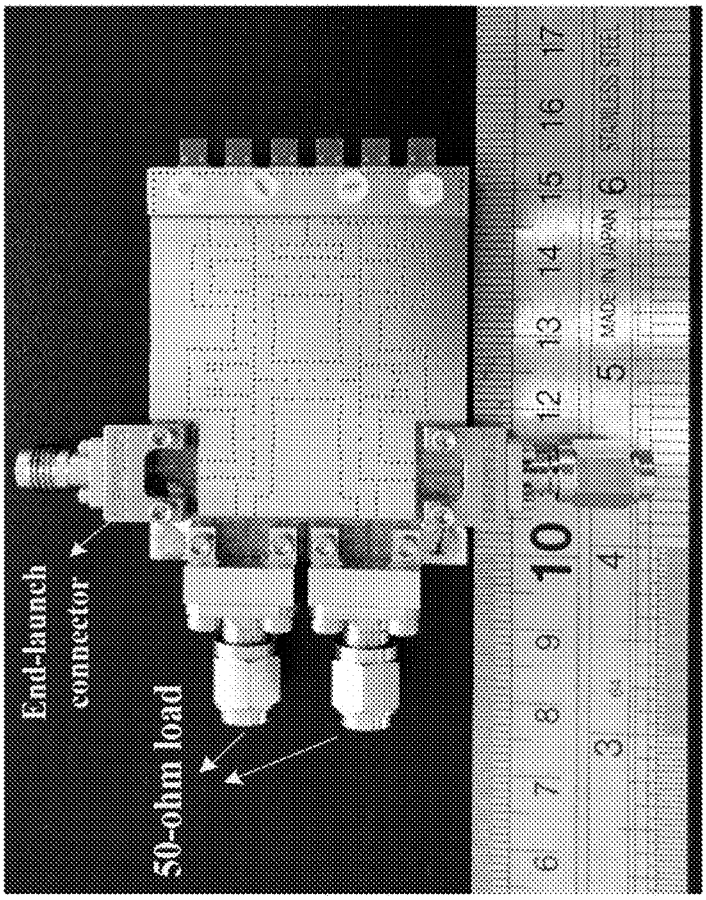
FIG. 25 presents an exemplary prototype of the 1×4 multi-beam antenna array according to the present invention.

FIG. 25 presents an exemplary prototype of the 1×4 multi-beam antenna array 10B according to the present invention. The S-parameters and radiation performances of the multi-beam array are measured. During each measurement, those untested ports are terminated by 50-ohm loads.

Figure 26:
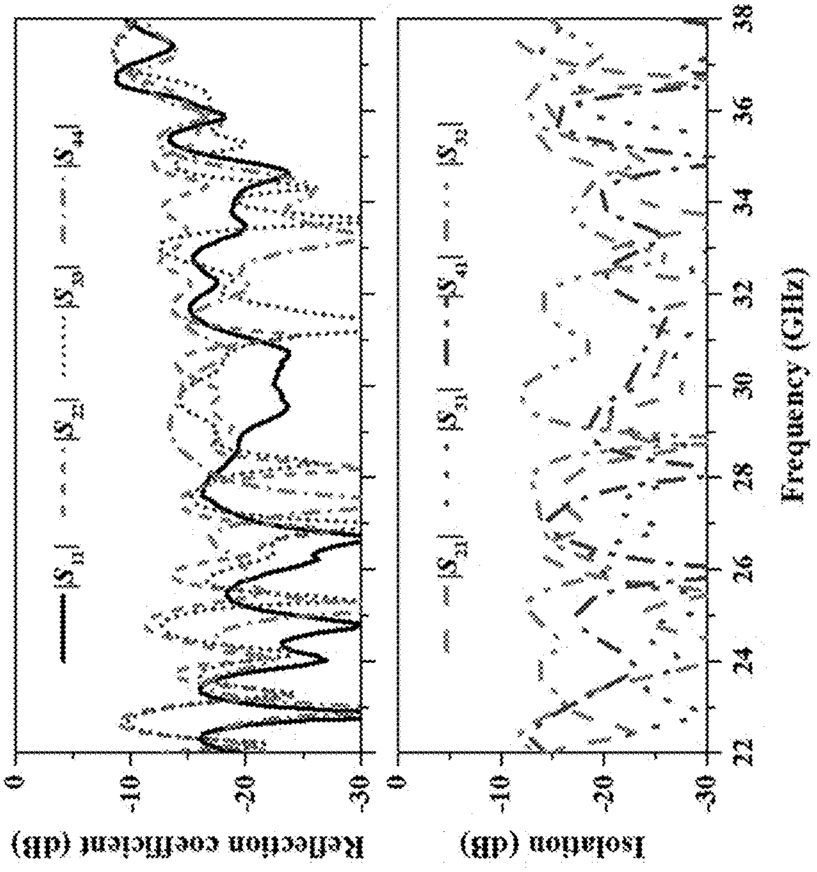
FIG. 26 presents the measured S-parameters of the multi-beam antenna array.

FIG. 26 presents the measured S-parameters of the multi-beam antenna array 10B. Due to the geometric symmetry, |S11| and |S44| equal with each other approximately, and so do |S22| and |S33|. All of these four reflection coefficients are smaller than −10 dB across 23-36.5 GHz. The overlapped impedance bandwidth is 45.4%. Within this band, |S21|, |S31|, |S41| and |S32|, which represent port isolation, are smaller than −12 dB.

Figure 27A:
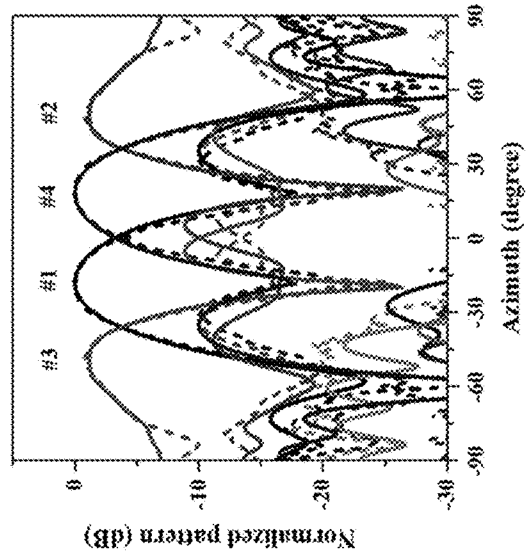
FIGS. 27A-27C shows normalized radiation patterns at 24 GHz, 30 GHz and 36 GHz for the multi-beam antenna array, respectively.
Figure 27B:
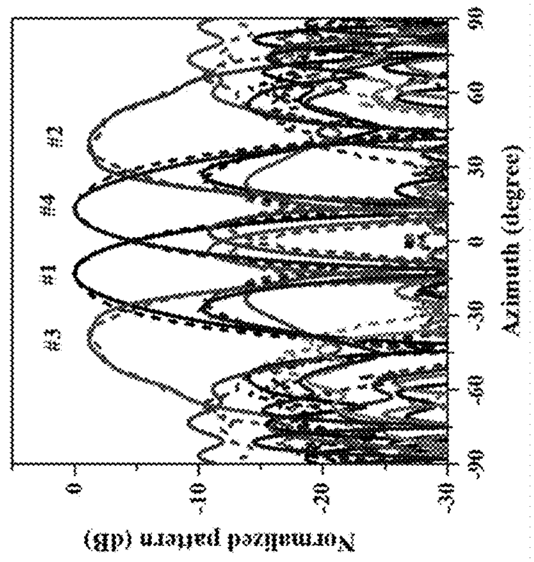
Figure 27C:
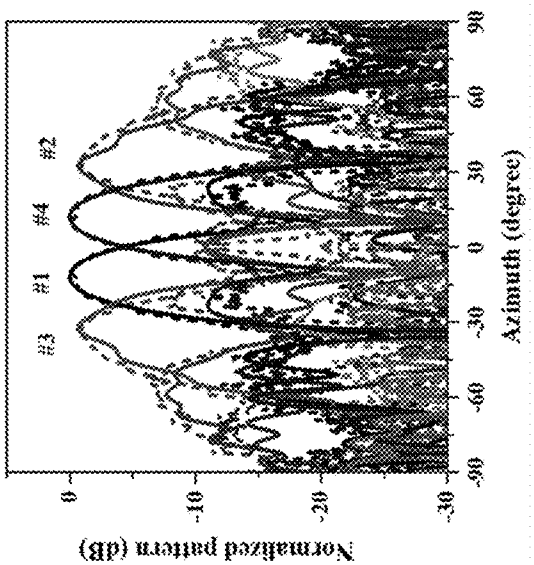

FIGS. 27A-27C shows normalized radiation patterns at 24 GHz, 30 GHz and 36 GHz respectively for the multi-beam antenna array 10B, where solid lines and dash lines represent the simulated and measured results respectively. The measured and simulated radiation patterns are in good agreement. The array steers the main beam at different azimuth angles when different ports are excited separately. The worst side lobe level is −6 dB and the cross polarization maintains below −20 dB. The scan angles and gains are summarized in table IV. Due to the geometric symmetry, only results when exciting Port #1 and Port #3 are listed. At 24 GHz, the array obtains the largest scan angles, ±19° and ±51°. With the frequency increasing, the scan angle reduces. The measured and simulated gains listed in Table 1 also agree with each other reasonably well. At all of these three frequencies, the gain variation due to beam-scanning is smaller than 0.9 dB.

TABLE 1

RADIATION PERFORMANCE OF THE MULTI-BEAM ARRAY

| | Port #1 | | Port #3 | |
|---|---|---|---|---|
| Frequency | Angle | Gain (dBi) | Angle | Gain (dBi) |
| 24 GHz | −19° | 9.6/9.8* | −51° | 8.8/8.6* |
| 30 GHz | −13° | 10.2/11* | −36° | 9.3/9.8* |
| 36 GHz | −10° | 9.2/10.6* | −32° | 8.7/9.9* |

'*' represents the simulated result.

Figure 28:
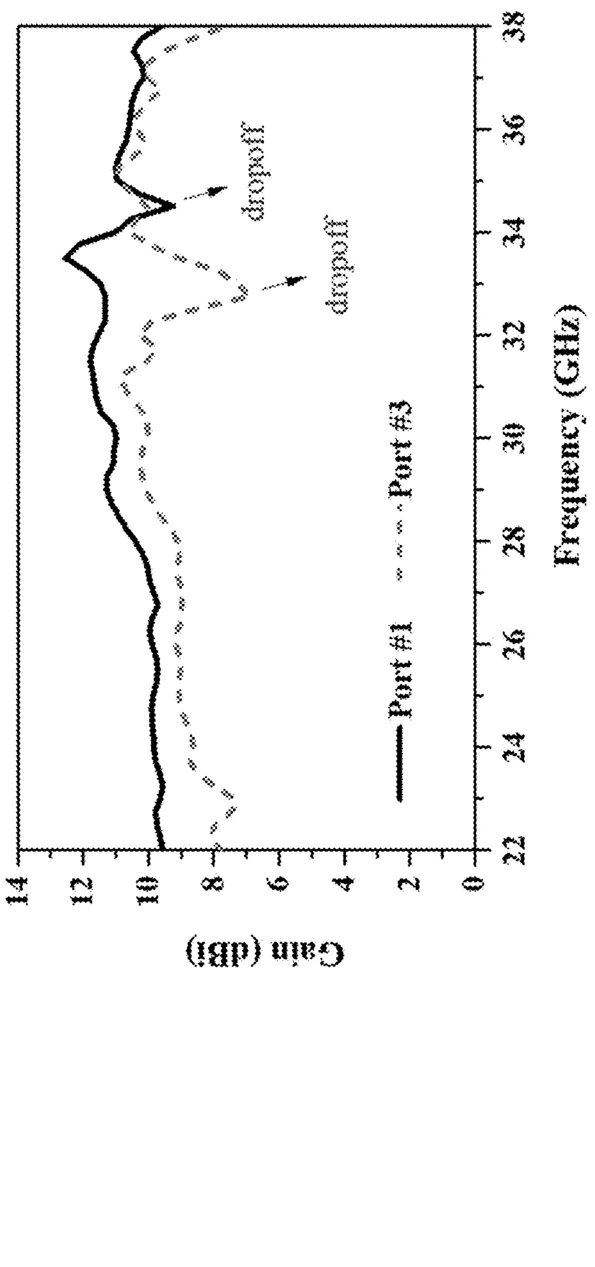
FIG. 28 shows simulated gain curves versus frequency for the multi-beam antenna array.

FIG. 28 shows simulated gain curves versus frequency for the multi-beam antenna array 10B. It can be observed that there exists a substantial drop-off near 34.5 GHz when Port #1 is excited and near 32.75 GHz when Port #3 is excited. This drop-off is caused by the grating lobe condition where a significant surface wave mode is generated along the arraying direction.

It should be understood that the conductive patches, plates, vias and strip lines described above can be made of any suitable metallic materials, including but not limited to, copper.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A millimeter-wave end-fire magneto-electric dipole antenna comprising:

a first substrate having a first substrate thickness;

a second substrate placed on the first substrate and having a second substrate thickness different from the first substrate thickness;

an asymmetric substrate integrated coaxial line (ASICL) feed, comprising:

a conductive signal line formed on an upper surface of the first substrate and placed between the first substrate and the second substrate; and two waveguiding walls positioned along and at both sides of the conductive signal line respectively and extending substantially perpendicularly through the first and second substrates;

a probe, comprising:

a lower strip portion deposited on a lower surface of the first substrate;

a middle strip portion deposited on an upper surface of the first substrate and connected to an extension from the conductive signal line;

an upper strip portion deposited on an upper surface of the second substrate;

a first connecting via extending substantively perpendicularly through the first and second substrates for connecting the lower strip portion and the upper strip portion; and a second connecting via extending substantively perpendicularly through the first substrate for connecting the lower strip portion and the middle strip portion.

2. The millimeter-wave end-fire magneto-electric dipole antenna according to claim 1, further comprising a shorted quarter-wave radiating patch antenna coupled to the probe and configured to act as a horizontal magnetic dipole source when being excited by the probe.

3. The millimeter-wave end-fire magneto-electric dipole antenna according to claim 2, wherein the shorted quarter-wave radiating patch antenna includes a pair of planar parallel plates being shorted to each other at one edge and being open at another opposite edge.

4. The millimeter-wave end-fire magneto-electric dipole antenna according to claim 3, wherein the pair of shorted planar parallel plates comprises:

a lower conductive planar plate extended from the lower ground plane provided on the lower surface of the first substrate; and an upper conductive planar plate extending from an upper ground plane provided on an upper surface of the second substrate.

5. The millimeter-wave end-fire magneto-electric dipole antenna according to claim 1, further comprising two vertical dipoles coupled to the probe and configured to act as a vertical electric dipole source when being excited by the probe.

6. The millimeter-wave end-fire magneto-electric dipole antenna according to claim 5, wherein the two vertical dipoles include:

a lower vertical dipole comprising a pair of conductive vias positioned at both side of the probe respectively and extending substantially perpendicularly through a third substrate placed underneath the first substrate; and an upper vertical dipole comprising a pair of conductive vias positioned at both side of the probe respectively and extending through a fourth substrate placed above the second substrate.

7. The millimeter-wave end-fire magneto-electric dipole antenna according to claim 6, further comprising a reflector including:

a lower reflecting wall extending substantially perpendicularly through the third substrate; and an upper reflecting wall extending substantially perpendicularly through the fourth substrate.

8. The millimeter-wave end-fire magneto-electric dipole antenna according to claim 7, wherein the reflector further includes a lower reflector strip placed on a bottom side of the lower reflecting wall and an upper reflector strip placed on a top side of the upper reflecting wall.

9. A fixed beam antenna array comprising a N number of antenna units, each being the millimeter-wave end-fire magneto-electric dipole antenna of claim 1.

10. The fixed beam antenna array according to claim 9, further comprising an ASIC-based 1-to-N power divider configured to act as a feed network connecting an input port to the N number of the antenna units.

11. The fixed beam antenna array according to claim 10, wherein the ASIC-based 1-to-N power divider is formed by cascading a N−1 number of 1-to-2 power dividers.

12. The fixed beam antenna array according to claim 9, wherein the antenna units are arranged as a 1-by-N linear array with a spacing of $0.64\lambda_0$, where $\lambda_0$ is a wavelength at a central operating frequency.

13. A multi-beam antenna array comprising:

a N number of antenna units, each being the millimeter-wave end-fire magneto-electric dipole antenna of claim 1; and an ASIC-based N-by-N Butler matrix configured to act as a feed network connecting a N number of input ports to the antenna units.

14. The multi-beam antenna array according to claim 13, wherein the ASIC-based N-by-N Butler matrix consists of four 3-dB hybrid couplers, two crossovers, two −45° phase shifters and two 0° phase shifters.

15. The multi-beam antenna array according to claim 13, wherein the antenna units are arranged as a 1-by-N linear array with a spacing of $0.54\lambda_0$, where $\lambda_0$ is a wavelength at a central operating frequency.

16. The multi-beam antenna array according to claim 15, further comprising two dummy antenna units added at each side of the linear array.

* * * * *